United States Patent
Vance et al.

(10) Patent No.: US 9,160,828 B2
(45) Date of Patent: Oct. 13, 2015

(54) MANAGING COMMUNICATIONS UTILIZING COMMUNICATION CATEGORIES

(71) Applicant: T-Mobile USA, Inc., Bellevue, WA (US)

(72) Inventors: Michael Steffen Vance, Kenmore, WA (US); Jasdeep Singh Chugh, Renton, WA (US); Jared T. Benson, Pleasant Hill, CA (US); Christian Robertson, Concord, CA (US); Shilpa R. Shah, Oakland, CA (US); Gabriel J. White, San Francisco, CA (US); Gordon Kar Kee Kam, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/040,465

(22) Filed: Sep. 27, 2013

(65) Prior Publication Data
US 2014/0220942 A1    Aug. 7, 2014

Related U.S. Application Data

(63) Continuation of application No. 12/413,397, filed on Mar. 27, 2009, now Pat. No. 8,577,350.

(51) Int. Cl.
*H04M 3/42*      (2006.01)
*H04M 1/57*      (2006.01)
(Continued)

(52) U.S. Cl.
CPC .......... *H04M 1/575* (2013.01); *H04M 1/72583* (2013.01); *H04W 4/12* (2013.01); *H04M 1/274508* (2013.01); *H04W 8/18* (2013.01); *H04W 88/02* (2013.01)

(58) Field of Classification Search
CPC . G06Q 50/01; G06Q 10/101; G06Q 10/1095; H04L 51/32; H04L 12/1818; H04L 12/588; H04L 67/306; H04L 51/02; H04L 63/102; H04L 67/22; G06F 17/30964; G06F 17/30525; G06F 17/30867; G06F 19/3418
USPC ........................................................ 455/414.1
See application file for complete search history.

(56) References Cited

U.S. PATENT DOCUMENTS

| | | |
|---|---|---|
| 4,723,209 A | 2/1988 | Hernandez et al. |
| D296,218 S | 6/1988 | Wells-Papanek et al. |

(Continued)

FOREIGN PATENT DOCUMENTS

| | | |
|---|---|---|
| DE | 10155431 A1 | 6/2003 |
| EP | 0767418 A1 | 4/1997 |

(Continued)

OTHER PUBLICATIONS

Alltel Corp at Lehman Brothers Worldwide Wireless, Wirelein, and Media Conference, Fair Disclosure Wire, May 22, 2006.

(Continued)

*Primary Examiner* — Kwasi Karikari
(74) *Attorney, Agent, or Firm* — Knobbe, Martens, Olson & Bear, LLP

(57) ABSTRACT

Systems, methods, and computer-readable mediums for managing communications on telecommunication devices utilizing communication categories are provided. A subset of contacts accessible by a telecommunication device are associated with one or more communication categories. Each communication category can be associated with a set of communication activities. Based on a selection of a specific contact, a telecommunication device can generate a display having display objects representative of communication categories associated with the selected contact. Additionally, based on a selection of a communication category, the telecommunication device can further generate a display including display objects representative of a set of communication activities corresponding to the selected communication category.

31 Claims, 10 Drawing Sheets

(51) Int. Cl.
  *H04M 1/725* (2006.01)
  *H04W 4/12* (2009.01)
  *H04M 1/2745* (2006.01)
  *H04W 8/18* (2009.01)
  *H04W 88/02* (2009.01)

(56) References Cited

U.S. PATENT DOCUMENTS

| | | |
|---|---|---|
| 5,590,256 A | 12/1996 | Tchao et al. |
| D384,052 S | 9/1997 | Kodosky |
| D388,424 S | 12/1997 | DeMuro et al. |
| D391,948 S | 3/1998 | Eisenberg |
| 5,724,531 A | 3/1998 | Miyashita et al. |
| 5,751,980 A | 5/1998 | Musashi et al. |
| D395,427 S | 6/1998 | Arora et al. |
| 5,793,365 A | 8/1998 | Tang et al. |
| 5,796,394 A | 8/1998 | Wicks et al. |
| D397,687 S | 9/1998 | Arora et al. |
| D398,595 S | 9/1998 | Baer et al. |
| 5,822,123 A | 10/1998 | Davis et al. |
| 5,867,226 A | 2/1999 | Wehmeyer et al. |
| 5,880,733 A | 3/1999 | Horvitz et al. |
| 5,889,517 A | 3/1999 | Ueda et al. |
| D415,483 S | 10/1999 | Decker |
| 5,987,107 A | 11/1999 | Brown |
| 5,987,469 A | 11/1999 | Lewis et al. |
| 6,006,200 A | 12/1999 | Boies et al. |
| 6,023,275 A | 2/2000 | Horvitz et al. |
| D424,036 S | 5/2000 | Arora et al. |
| D424,541 S | 5/2000 | Mugura |
| 6,104,398 A | 8/2000 | Cox, Jr. et al. |
| 6,130,726 A | 10/2000 | Darbee et al. |
| 6,144,863 A | 11/2000 | Charron |
| 6,151,059 A | 11/2000 | Schein et al. |
| D437,858 S | 2/2001 | Yasui et al. |
| 6,188,406 B1 | 2/2001 | Fong et al. |
| D438,873 S | 3/2001 | Wang et al. |
| 6,201,957 B1 | 3/2001 | Son et al. |
| D440,979 S | 4/2001 | Wang et al. |
| 6,222,921 B1 | 4/2001 | Mugura et al. |
| 6,226,367 B1 | 5/2001 | Smith et al. |
| 6,236,398 B1 | 5/2001 | Kojima et al. |
| 6,249,863 B1 | 6/2001 | Redford et al. |
| D445,426 S | 7/2001 | Wang et al. |
| D446,790 S | 8/2001 | Wang et al. |
| 6,313,877 B1 | 11/2001 | Anderson |
| 6,332,024 B1 | 12/2001 | Inoue et al. |
| D454,138 S | 3/2002 | Imamura et al. |
| D454,139 S | 3/2002 | Feldcamp |
| 6,359,635 B1 | 3/2002 | Perttunen |
| 6,393,430 B1 | 5/2002 | Van Ryzin |
| D459,361 S | 6/2002 | Inagaki |
| D463,444 S | 9/2002 | Istvan et al. |
| 6,460,181 B1 | 10/2002 | Donnelly |
| 6,486,870 B1 | 11/2002 | Kozu |
| D467,252 S | 12/2002 | Lee |
| D469,442 S | 1/2003 | Bohlen, Jr. et al. |
| D470,857 S | 2/2003 | Anderson et al. |
| D471,226 S | 3/2003 | Gray |
| 6,532,459 B1 | 3/2003 | Berson |
| 6,538,635 B1 | 3/2003 | Ringot |
| D472,902 S | 4/2003 | Nashida et al. |
| D473,236 S | 4/2003 | Robbin et al. |
| D474,198 S | 5/2003 | Barnes |
| D474,778 S | 5/2003 | Barnes |
| D475,064 S | 5/2003 | Nashida et al. |
| 6,563,515 B1 | 5/2003 | Reynolds et al. |
| 6,577,330 B1 | 6/2003 | Tsuda et al. |
| 6,600,936 B1 | 7/2003 | Karkkainen et al. |
| D478,912 S | 8/2003 | Johnson |
| D485,279 S | 1/2004 | DeCombe |
| 6,678,891 B1 | 1/2004 | Wilcox et al. |
| D486,499 S | 2/2004 | Hayashi et al. |
| 6,741,268 B1 | 5/2004 | Hayakawa |
| 6,757,365 B1 | 6/2004 | Bogard |
| D495,339 S | 8/2004 | Gildred |
| 6,775,659 B2 | 8/2004 | Clifton-Bligh |
| 6,781,575 B1 | 8/2004 | Hawkins et al. |
| D495,715 S | 9/2004 | Gildred |
| 6,788,987 B2 | 9/2004 | Slechta et al. |
| 6,801,849 B2 | 10/2004 | Szukala et al. |
| 6,845,153 B2 | 1/2005 | Tiburtius et al. |
| 6,850,255 B2 | 2/2005 | Muschetto |
| 6,865,404 B1 | 3/2005 | Tikkala et al. |
| D506,474 S | 6/2005 | Gildred |
| 6,907,575 B2 | 6/2005 | Duarte |
| D507,577 S | 7/2005 | Totten et al. |
| 6,925,650 B1 | 8/2005 | Arsenault et al. |
| D510,581 S | 10/2005 | Robbin et al. |
| 6,959,207 B2 | 10/2005 | Keinonen et al. |
| 6,975,712 B1 | 12/2005 | Schnarel et al. |
| 6,978,473 B1 | 12/2005 | Nsonwu et al. |
| 7,007,239 B1 | 2/2006 | Hawkins et al. |
| 7,036,091 B1 | 4/2006 | Nguyen et al. |
| 7,046,993 B2 | 5/2006 | Haaramo et al. |
| D523,439 S | 6/2006 | Kuroda |
| D523,440 S | 6/2006 | Hernandez et al. |
| D523,868 S | 6/2006 | Kuroda |
| 7,083,109 B2 | 8/2006 | Pouchak |
| 7,086,008 B2 | 8/2006 | Capps et al. |
| 7,089,287 B2 | 8/2006 | Bellotti et al. |
| 7,099,862 B2 | 8/2006 | Fitzpatrick et al. |
| D528,556 S | 9/2006 | Decombe |
| 7,111,788 B2 | 9/2006 | Reponen |
| 7,117,445 B2 | 10/2006 | Berger |
| 7,137,073 B2 | 11/2006 | Kim et al. |
| 7,174,516 B2 | 2/2007 | Chipchase |
| 7,178,109 B2 | 2/2007 | Hewson et al. |
| 7,187,761 B2 | 3/2007 | Bookstaff |
| D540,340 S | 4/2007 | Cummins |
| D543,986 S | 6/2007 | Rimas-Ribikauskas et al. |
| D543,987 S | 6/2007 | Rimas-Ribikauskas et al. |
| D543,992 S | 6/2007 | Vigesaa |
| D544,875 S | 6/2007 | Wang et al. |
| D544,877 S | 6/2007 | Sasser |
| D545,324 S | 6/2007 | Decombe |
| 7,231,229 B1 | 6/2007 | Hawkins et al. |
| 7,236,576 B2 | 6/2007 | Schnarel et al. |
| 7,236,780 B2 | 6/2007 | Benco et al. |
| D545,827 S | 7/2007 | Evans et al. |
| D545,832 S | 7/2007 | Armendariz |
| D546,342 S | 7/2007 | Armendariz |
| D547,321 S | 7/2007 | Viegers et al. |
| 7,248,677 B2 | 7/2007 | Randall et al. |
| 7,248,857 B1 | 7/2007 | Richardson et al. |
| D548,239 S | 8/2007 | Rimas-Ribikauskas et al. |
| D548,743 S | 8/2007 | Takahashi et al. |
| D550,681 S | 9/2007 | Totten et al. |
| D551,252 S | 9/2007 | Andre et al. |
| D552,114 S | 10/2007 | Tolle et al. |
| D554,142 S | 10/2007 | Cameron |
| 7,280,652 B2 | 10/2007 | Bocking et al. |
| D554,652 S | 11/2007 | Shen et al. |
| D556,765 S | 12/2007 | Evans et al. |
| D557,268 S | 12/2007 | Fletcher |
| D558,221 S | 12/2007 | Nagata et al. |
| D562,343 S | 2/2008 | Fletcher |
| 7,330,845 B2 | 2/2008 | Lee et al. |
| D563,972 S | 3/2008 | Sherry |
| 7,343,565 B2 | 3/2008 | Ying et al. |
| D565,586 S | 4/2008 | Shin et al. |
| D565,627 S | 4/2008 | Kase |
| D567,251 S | 4/2008 | Sadler |
| D567,817 S | 4/2008 | Kwag et al. |
| 7,353,034 B2 | 4/2008 | Haney |
| 7,360,174 B2 | 4/2008 | Grossman et al. |
| D568,334 S | 5/2008 | Okaro et al. |
| D568,897 S | 5/2008 | Byeon |
| D568,898 S | 5/2008 | Byeon |
| D568,899 S | 5/2008 | Byeon |
| D569,387 S | 5/2008 | Byeon |
| 7,369,850 B2 | 5/2008 | Andrew et al. |
| D570,369 S | 6/2008 | Fletcher |
| D571,819 S | 6/2008 | Scott et al. |

(56) References Cited

U.S. PATENT DOCUMENTS

| | | |
|---|---|---|
| D573,601 S | 7/2008 | Gregov et al. |
| D574,392 S | 8/2008 | Kwag et al. |
| D575,297 S | 8/2008 | Glezer et al. |
| D575,298 S | 8/2008 | Chen et al. |
| D575,792 S | 8/2008 | Benson |
| D576,174 S | 9/2008 | Ording et al. |
| D577,364 S | 9/2008 | Flynt et al. |
| D578,134 S | 10/2008 | Jasinski |
| D578,543 S | 10/2008 | Ulm et al. |
| 7,437,005 B2 | 10/2008 | Drucker et al. |
| D580,450 S | 11/2008 | Chen et al. |
| D580,946 S | 11/2008 | Chen et al. |
| 7,450,927 B1 | 11/2008 | Creswell et al. |
| D582,426 S | 12/2008 | Chen et al. |
| D582,928 S | 12/2008 | Blankenship et al. |
| D583,823 S | 12/2008 | Chen et al. |
| D584,737 S | 1/2009 | Stone et al. |
| D585,453 S | 1/2009 | Chen et al. |
| D585,454 S | 1/2009 | Ismail |
| D586,361 S | 2/2009 | Horowitz et al. |
| D586,362 S | 2/2009 | Horowitz et al. |
| 7,490,295 B2 | 2/2009 | Chaudhri et al. |
| D588,148 S | 3/2009 | Stone et al. |
| D588,149 S | 3/2009 | Brownell et al. |
| D588,150 S | 3/2009 | Stone et al. |
| 7,503,014 B2 | 3/2009 | Tojo et al. |
| D589,970 S | 4/2009 | Bhat et al. |
| D590,407 S | 4/2009 | Watanabe et al. |
| D590,412 S | 4/2009 | Saft et al. |
| 7,519,912 B2 | 4/2009 | Moody et al. |
| 7,526,306 B2 | 4/2009 | Brems et al. |
| D592,218 S | 5/2009 | Blankenship et al. |
| D592,674 S | 5/2009 | Kwag |
| D593,120 S | 5/2009 | Bouchard et al. |
| 7,536,654 B2 | 5/2009 | Anthony et al. |
| D593,574 S | 6/2009 | Guimaraes et al. |
| D593,576 S | 6/2009 | Ball et al. |
| D594,015 S | 6/2009 | Singh et al. |
| D594,465 S | 6/2009 | Hong et al. |
| D594,872 S | 6/2009 | Akimoto |
| 7,543,245 B2 | 6/2009 | Irimajiri |
| 7,546,543 B2 | 6/2009 | Louch et al. |
| 7,555,727 B2 | 6/2009 | Hawkins et al. |
| D596,192 S | 7/2009 | Shotel |
| 7,562,304 B2 | 7/2009 | Dixon et al. |
| 7,577,700 B2 | 8/2009 | Tolson et al. |
| 7,580,363 B2 | 8/2009 | Sorvari et al. |
| D599,368 S | 9/2009 | Kanga et al. |
| D599,806 S | 9/2009 | Brown et al. |
| D599,807 S | 9/2009 | Marashi |
| D599,810 S | 9/2009 | Scalisi et al. |
| D599,811 S | 9/2009 | Watanabe et al. |
| D599,812 S | 9/2009 | Hirsch |
| D599,813 S | 9/2009 | Hirsch |
| D599,814 S | 9/2009 | Ogura et al. |
| D601,153 S | 9/2009 | Setiawan et al. |
| 7,587,215 B2 | 9/2009 | Chakraborty et al. |
| 7,587,683 B2 | 9/2009 | Ito et al. |
| D602,038 S | 10/2009 | Channell et al. |
| 7,603,628 B2 | 10/2009 | Park et al. |
| D603,415 S | 11/2009 | Lin et al. |
| D603,416 S | 11/2009 | Poling et al. |
| D603,418 S | 11/2009 | Magnani et al. |
| D603,420 S | 11/2009 | Channell |
| D603,867 S | 11/2009 | La et al. |
| D604,310 S | 11/2009 | Ahn |
| D604,316 S | 11/2009 | Hoefnagels et al. |
| D604,317 S | 11/2009 | Hoefnagels et al. |
| D604,740 S | 11/2009 | Matheny et al. |
| 7,620,996 B2 | 11/2009 | Torres et al. |
| D605,200 S | 12/2009 | Sakai |
| D605,652 S | 12/2009 | Plaisted et al. |
| D605,653 S | 12/2009 | Danton |
| D606,088 S | 12/2009 | Yokouchi et al. |
| D606,550 S | 12/2009 | La et al. |
| D607,002 S | 12/2009 | Jonasson et al. |
| 7,636,889 B2 | 12/2009 | Weber et al. |
| D608,364 S | 1/2010 | Walsh et al. |
| D608,366 S | 1/2010 | Matas |
| D608,367 S | 1/2010 | Scalisi et al. |
| D608,368 S | 1/2010 | Bamford |
| 7,646,745 B2 | 1/2010 | Caldwell et al. |
| 7,650,361 B1 | 1/2010 | Wong et al. |
| D609,714 S | 2/2010 | Oda et al. |
| D609,715 S | 2/2010 | Chaudhri |
| D610,159 S | 2/2010 | Matheny et al. |
| D610,161 S | 2/2010 | Matas |
| 7,665,028 B2 | 2/2010 | Cummins et al. |
| 7,665,033 B2 | 2/2010 | Byrne et al. |
| D611,056 S | 3/2010 | Langlois et al. |
| D611,484 S | 3/2010 | Mays et al. |
| D611,485 S | 3/2010 | Marashi |
| D611,489 S | 3/2010 | Bell et al. |
| D611,490 S | 3/2010 | Lee et al. |
| D612,394 S | 3/2010 | La et al. |
| D612,860 S | 3/2010 | Tarara et al. |
| 7,673,017 B2 | 3/2010 | Kim et al. |
| 7,685,520 B2 | 3/2010 | Rashkovskiy et al. |
| 7,685,530 B2 | 3/2010 | Sherrard et al. |
| D613,300 S | 4/2010 | Chaudhri |
| D613,747 S | 4/2010 | Jonasson et al. |
| D614,191 S | 4/2010 | Takano et al. |
| D614,192 S | 4/2010 | Takano et al. |
| D614,633 S | 4/2010 | Watanabe et al. |
| D614,643 S | 4/2010 | Viegers et al. |
| D614,646 S | 4/2010 | Chen et al. |
| 7,702,543 B2 | 4/2010 | MacKay et al. |
| 7,703,031 B2 | 4/2010 | Nakagawa et al. |
| 7,705,833 B2 | 4/2010 | Kim |
| D615,090 S | 5/2010 | Sogabe |
| D615,546 S | 5/2010 | Lundy et al. |
| D615,549 S | 5/2010 | Caine et al. |
| 7,720,498 B2 | 5/2010 | Lee |
| D617,804 S | 6/2010 | Hirsch |
| D617,805 S | 6/2010 | Scalisi et al. |
| D618,250 S | 6/2010 | Stallings et al. |
| 7,735,021 B2 | 6/2010 | Padawer et al. |
| 7,738,912 B1 | 6/2010 | Hawkins et al. |
| D619,593 S | 7/2010 | Fujioka et al. |
| D619,594 S | 7/2010 | Jonasson et al. |
| D620,948 S | 8/2010 | Scalisi et al. |
| D621,844 S | 8/2010 | Van Os |
| D621,845 S | 8/2010 | Anzures et al. |
| D622,280 S | 8/2010 | Tarara |
| 7,779,358 B1 | 8/2010 | Gupta et al. |
| D624,556 S | 9/2010 | Chaudhri |
| 7,797,641 B2 | 9/2010 | Karukka et al. |
| D625,325 S | 10/2010 | Vu et al. |
| D626,136 S | 10/2010 | Fujimura |
| D627,790 S | 11/2010 | Chaudhri |
| D628,206 S | 11/2010 | Lemay |
| 7,831,675 B2 | 11/2010 | Narayanaswami et al. |
| 7,898,600 B2 | 3/2011 | Lee et al. |
| D638,025 S | 5/2011 | Saft et al. |
| 7,971,222 B2 | 6/2011 | Ellis |
| 8,015,187 B2 | 9/2011 | Choi et al. |
| 8,032,470 B1 | 10/2011 | Heidenreich et al. |
| 8,046,801 B2 | 10/2011 | Ellis et al. |
| D652,843 S | 1/2012 | Van Os |
| 8,631,351 B2 | 1/2014 | Fong et al. |
| 2001/0044743 A1 | 11/2001 | McKinley et al. |
| 2001/0046886 A1 | 11/2001 | Ishigaki |
| 2002/0045960 A1 | 4/2002 | Phillips et al. |
| 2002/0052754 A1 | 5/2002 | Joyce et al. |
| 2002/0054164 A1 | 5/2002 | Uemura |
| 2002/0059201 A1 | 5/2002 | Work |
| 2002/0145623 A1 | 10/2002 | Decombe |
| 2003/0014179 A1 | 1/2003 | Szukala et al. |
| 2003/0078033 A1 | 4/2003 | Sauer et al. |
| 2003/0164818 A1 | 9/2003 | Miller-Smith et al. |
| 2003/0210265 A1 | 11/2003 | Haimberg |
| 2003/0224816 A1 | 12/2003 | Kundaje et al. |
| 2004/0017376 A1 | 1/2004 | Tagliabue et al. |
| 2004/0041836 A1 | 3/2004 | Zaner et al. |

(56) References Cited

U.S. PATENT DOCUMENTS

| | | |
|---|---|---|
| 2004/0046796 A1 | 3/2004 | Fujita |
| 2004/0067751 A1 | 4/2004 | Vandermeijden |
| 2004/0075691 A1 | 4/2004 | Moon |
| 2004/0077340 A1 | 4/2004 | Forsyth |
| 2004/0091093 A1 | 5/2004 | Bookstaff |
| 2004/0100479 A1 | 5/2004 | Nakano et al. |
| 2004/0102225 A1 | 5/2004 | Furuta et al. |
| 2004/0119758 A1 | 6/2004 | Grossman et al. |
| 2004/0122683 A1 | 6/2004 | Grossman et al. |
| 2004/0122684 A1 | 6/2004 | Kaikuranta |
| 2004/0133638 A1 | 7/2004 | Doss et al. |
| 2004/0155908 A1 | 8/2004 | Wagner |
| 2004/0162812 A1 | 8/2004 | Lane |
| 2004/0172455 A1 | 9/2004 | Green et al. |
| 2004/0185890 A1 | 9/2004 | Drozt et al. |
| 2004/0221239 A1 | 11/2004 | Hachigian et al. |
| 2004/0235520 A1 | 11/2004 | Cadiz et al. |
| 2004/0236749 A1 | 11/2004 | Cortright et al. |
| 2004/0237048 A1 | 11/2004 | Tojo et al. |
| 2004/0239982 A1 | 12/2004 | Gignac |
| 2004/0250217 A1 | 12/2004 | Tojo et al. |
| 2004/0268228 A1 | 12/2004 | Croney et al. |
| 2004/0268265 A1 | 12/2004 | Berger |
| 2005/0005235 A1 | 1/2005 | Satterfield et al. |
| 2005/0010876 A1 | 1/2005 | Robertson et al. |
| 2005/0033603 A1 | 2/2005 | Suzuki et al. |
| 2005/0033698 A1 | 2/2005 | Chapman |
| 2005/0039140 A1 | 2/2005 | Chen |
| 2005/0041011 A1 | 2/2005 | Silfverberg et al. |
| 2005/0071780 A1 | 3/2005 | Muller et al. |
| 2005/0079863 A1 | 4/2005 | Macaluso |
| 2005/0086611 A1 | 4/2005 | Takabe et al. |
| 2005/0091272 A1 | 4/2005 | Smith et al. |
| 2005/0094205 A1 | 5/2005 | Lo et al. |
| 2005/0114374 A1 | 5/2005 | Juszkiewicz et al. |
| 2005/0118996 A1 | 6/2005 | Lee et al. |
| 2005/0120306 A1 | 6/2005 | Klassen et al. |
| 2005/0138574 A1 | 6/2005 | Lin |
| 2005/0143135 A1 | 6/2005 | Brems et al. |
| 2005/0143138 A1 | 6/2005 | Lee et al. |
| 2005/0160376 A1 | 7/2005 | Sciammarella et al. |
| 2005/0163290 A1 | 7/2005 | Gilles et al. |
| 2005/0172001 A1 | 8/2005 | Zaner et al. |
| 2005/0182837 A1 | 8/2005 | Harris et al. |
| 2005/0209994 A1 | 9/2005 | Noro et al. |
| 2005/0210104 A1 | 9/2005 | Torvinen |
| 2005/0229110 A1 | 10/2005 | Gegner et al. |
| 2005/0235225 A1 | 10/2005 | Pradhan et al. |
| 2005/0235226 A1 | 10/2005 | Watanabe et al. |
| 2005/0235251 A1 | 10/2005 | Arend et al. |
| 2005/0243979 A1 | 11/2005 | Starbuck et al. |
| 2005/0245236 A1 | 11/2005 | Servi et al. |
| 2005/0246654 A1 | 11/2005 | Hally et al. |
| 2005/0261011 A1 | 11/2005 | Scott |
| 2005/0261032 A1 | 11/2005 | Seo et al. |
| 2005/0278652 A1 | 12/2005 | Scholz |
| 2006/0009249 A1 | 1/2006 | Fu et al. |
| 2006/0010395 A1 | 1/2006 | Aaltonen |
| 2006/0030347 A1 | 2/2006 | Biswaas |
| 2006/0048076 A1 | 3/2006 | Vronay et al. |
| 2006/0053379 A1 | 3/2006 | Henderson et al. |
| 2006/0055700 A1 | 3/2006 | Niles et al. |
| 2006/0084410 A1 | 4/2006 | Sutaria et al. |
| 2006/0101350 A1 | 5/2006 | Scott |
| 2006/0112354 A1 | 5/2006 | Park et al. |
| 2006/0123360 A1 | 6/2006 | Anwar et al. |
| 2006/0140015 A1 | 6/2006 | Kasamsetty |
| 2006/0141996 A1 | 6/2006 | Huh |
| 2006/0143574 A1 | 6/2006 | Ito et al. |
| 2006/0146765 A1 | 7/2006 | Van De Sluis et al. |
| 2006/0148499 A1 | 7/2006 | Chie |
| 2006/0148522 A1 | 7/2006 | Chipchase et al. |
| 2006/0168539 A1 | 7/2006 | Hawkins et al. |
| 2006/0174121 A1 | 8/2006 | Omae et al. |
| 2006/0212829 A1 | 9/2006 | Yahiro et al. |
| 2006/0223518 A1 | 10/2006 | Haney |
| 2006/0242581 A1 | 10/2006 | Manion et al. |
| 2006/0242597 A1 | 10/2006 | Park |
| 2006/0253787 A1 | 11/2006 | Fogg |
| 2006/0277488 A1 | 12/2006 | Cok et al. |
| 2006/0293057 A1 | 12/2006 | Mazerski et al. |
| 2007/0011617 A1 | 1/2007 | Akagawa et al. |
| 2007/0026645 A1 | 2/2007 | Lieber et al. |
| 2007/0027920 A1 | 2/2007 | Alvarado et al. |
| 2007/0032267 A1 | 2/2007 | Haitani et al. |
| 2007/0033540 A1 | 2/2007 | Bridges et al. |
| 2007/0043688 A1 | 2/2007 | Kountz et al. |
| 2007/0060206 A1 | 3/2007 | Dam Nielsen et al. |
| 2007/0067738 A1 | 3/2007 | Flynt et al. |
| 2007/0072586 A1 | 3/2007 | Morhenn et al. |
| 2007/0073874 A1 | 3/2007 | Moghaddam et al. |
| 2007/0079246 A1 | 4/2007 | Morillon et al. |
| 2007/0118813 A1 | 5/2007 | Forstall et al. |
| 2007/0129112 A1 | 6/2007 | Tarn |
| 2007/0135103 A1 | 6/2007 | Middleton |
| 2007/0136687 A1 | 6/2007 | Pak |
| 2007/0162862 A1 | 7/2007 | Ogasawara et al. |
| 2007/0168262 A1 | 7/2007 | Morotomi et al. |
| 2007/0174389 A1 | 7/2007 | Armstrong et al. |
| 2007/0198947 A1 | 8/2007 | Cox et al. |
| 2007/0226645 A1 | 9/2007 | Kongqiao et al. |
| 2007/0250936 A1 | 10/2007 | Nakamura et al. |
| 2007/0268908 A1 | 11/2007 | Linkola et al. |
| 2007/0271528 A1 | 11/2007 | Park et al. |
| 2008/0022228 A1 | 1/2008 | Kwon et al. |
| 2008/0034317 A1 | 2/2008 | Fard et al. |
| 2008/0059570 A1 | 3/2008 | Bill |
| 2008/0081653 A1 | 4/2008 | Mock et al. |
| 2008/0086703 A1 | 4/2008 | Flynt et al. |
| 2008/0098311 A1 | 4/2008 | Delarue et al. |
| 2008/0111826 A1 | 5/2008 | Endrikhovski et al. |
| 2008/0122870 A1 | 5/2008 | Brodersen et al. |
| 2008/0158189 A1 | 7/2008 | Kim |
| 2008/0172030 A1 | 7/2008 | Blomquist |
| 2008/0189614 A1 | 8/2008 | Jeong et al. |
| 2008/0189627 A1 | 8/2008 | Nikitin et al. |
| 2008/0194934 A1 | 8/2008 | Ray et al. |
| 2008/0215978 A1 | 9/2008 | Bamba |
| 2008/0220751 A1 | 9/2008 | De Bast |
| 2008/0220752 A1 | 9/2008 | Forstall et al. |
| 2008/0235248 A1 | 9/2008 | Krantz et al. |
| 2008/0256170 A1 | 10/2008 | Hayashi et al. |
| 2008/0261569 A1 | 10/2008 | Britt et al. |
| 2008/0263069 A1 | 10/2008 | Harris et al. |
| 2008/0280600 A1 | 11/2008 | Zhou |
| 2008/0282158 A1 | 11/2008 | Aaltonen et al. |
| 2008/0288612 A1 | 11/2008 | Kwon |
| 2008/0288880 A1 | 11/2008 | Reponen et al. |
| 2009/0040875 A1 | 2/2009 | Buzescu et al. |
| 2009/0043847 A1 | 2/2009 | Laurila |
| 2009/0077496 A1 | 3/2009 | Aravamudan et al. |
| 2009/0164923 A1 | 6/2009 | Ovi |
| 2009/0187630 A1 | 7/2009 | Narayanaswami et al. |
| 2009/0199120 A1 | 8/2009 | Baxter et al. |
| 2009/0228513 A1 | 9/2009 | Tian |
| 2009/0300518 A1 | 12/2009 | Mock et al. |
| 2009/0303188 A1 | 12/2009 | Triplett |
| 2010/0004008 A1 | 1/2010 | Abolrous et al. |
| 2010/0020727 A1 | 1/2010 | Narayan et al. |
| 2010/0020953 A1 | 1/2010 | Lidstrom et al. |
| 2010/0050123 A1 | 2/2010 | Sherrard et al. |
| 2010/0062753 A1* | 3/2010 | Wen et al. ............... 455/418 |
| 2010/0094837 A1 | 4/2010 | O'Sullivan et al. |
| 2010/0095009 A1 | 4/2010 | Matuszewski et al. |
| 2010/0144331 A1 | 6/2010 | Koberg et al. |
| 2010/0180001 A1 | 7/2010 | Hardt |
| 2010/0190467 A1 | 7/2010 | Scott et al. |
| 2010/0190468 A1 | 7/2010 | Scott et al. |
| 2010/0241544 A1 | 9/2010 | Benson et al. |
| 2010/0245262 A1 | 9/2010 | Vance et al. |
| 2010/0248701 A1 | 9/2010 | Vance et al. |
| 2010/0250606 A1 | 9/2010 | Vance et al. |
| 2010/0287504 A1 | 11/2010 | Vance et al. |
| 2010/0333029 A1 | 12/2010 | Smith et al. |

(56) References Cited

U.S. PATENT DOCUMENTS

| | | | |
|---|---|---|---|
| 2011/0258547 | A1 | 10/2011 | Symons et al. |
| 2012/0071244 | A1 | 3/2012 | Gillo et al. |
| 2013/0019173 | A1 | 1/2013 | Kotler et al. |
| 2013/0019203 | A1 | 1/2013 | Kotler et al. |
| 2013/0024780 | A1 | 1/2013 | Sutedja et al. |
| 2013/0275897 | A1 | 10/2013 | Vance et al. |
| 2013/0281161 | A1 | 10/2013 | Vance et al. |
| 2013/0283180 | A1 | 10/2013 | Vance et al. |
| 2014/0033071 | A1 | 1/2014 | Gruber et al. |
| 2015/0072644 | A1 | 3/2015 | Sherrard et al. |

FOREIGN PATENT DOCUMENTS

| | | | |
|---|---|---|---|
| EP | 1246434 | A1 | 10/2002 |
| EP | 1469374 | A1 | 10/2004 |
| EP | 1482758 | A1 | 12/2004 |
| EP | 1571808 | A1 | 9/2005 |
| EP | 1608190 | A1 | 12/2005 |
| JP | 07-129363 | A | 5/1995 |
| JP | 08-123658 | A | 5/1996 |
| JP | 09-083630 | A | 3/1997 |
| JP | 09-311661 | A | 12/1997 |
| JP | H11-088496 | A | 3/1999 |
| JP | H11-327741 | A | 11/1999 |
| JP | 2000-259304 | A | 9/2000 |
| JP | 2000-348058 | A | 12/2000 |
| JP | 2002-009899 | A | 1/2002 |
| JP | 2003-198705 | A | 7/2003 |
| JP | 2004-208217 | A | 7/2004 |
| JP | 2004-348601 | A | 12/2004 |
| JP | 2005-072958 | A | 3/2005 |
| JP | 3834039 | B2 | 10/2006 |
| KR | 10-2002-0069964 | A | 9/2002 |
| KR | 10-2004-0024967 | A | 3/2004 |
| KR | 10-2005-0043148 | A | 5/2005 |
| KR | 10-2006-0042808 | A | 5/2006 |
| KR | 10-2007-0029009 | A | 3/2007 |
| KR | 10-2008-0004127 | A | 1/2008 |
| KR | 10-2008-0019614 | A | 3/2008 |
| KR | 10-2008-0079716 | A | 9/2008 |
| WO | WO 00/25501 | A1 | 5/2000 |
| WO | WO 03/044756 | A1 | 5/2003 |
| WO | WO 03/062976 | A1 | 7/2003 |
| WO | WO 2005/045799 | A1 | 5/2005 |
| WO | WO 2005/064441 | A1 | 7/2005 |
| WO | WO 2005/120112 | A1 | 12/2005 |
| WO | WO 2006/016227 | A2 | 2/2006 |
| WO | WO 2006/067567 | A1 | 6/2006 |
| WO | WO 2007/093997 | A1 | 8/2007 |
| WO | WO 2007/143678 | A2 | 12/2007 |
| WO | WO 2008/030776 | A2 | 3/2008 |
| WO | WO 2010/111610 | | 9/2010 |
| WO | WO 2010/111614 | | 9/2010 |
| WO | WO 2010/111637 | | 9/2010 |
| WO | WO 2010/111642 | | 9/2010 |
| WO | WO 2010/111643 | | 9/2010 |
| WO | WO 2010/111670 | | 9/2010 |
| WO | WO 2010/111679 | | 9/2010 |

OTHER PUBLICATIONS

Alltel Launches 'My Circle,' a One-of-a-Kind Program That Gives Customers Free Calls to Any Network or Number They Choose, Business Wire, Apr. 20, 2006, 1 page, New York.
Alltel's 'My Circle' Plan Lets Subscribers Adds 10 Numbers for Unlimited Calls, Wireless News, Apr. 23, 2006, 2 pages, Coventry.
Belson, K., Alltel to Offer Free-Calling Plan, With Limits, New York Times, Apr. 21, 2006, p. C9, New York.
Boy Genius, LG Xenon hitting AT&T Before Christmas?, http://www.boygeniusreport.com/2008/09/24/lg-xenon-hitting-att-before-christmas/, Sep. 24, 2008, 1 page.
Cuneo, A.Z., Alltel Gets Aggressive in Telecom War, Advertising Age, Chicago (Midwest region edition), Apr. 24, 2006, vol. 77, Issue 17, 8 pages.
Larson, V., Alltel's free wireless calling plan paying off, Knight Rider Tribune Business News, May 2005, pp. 2.
LG Xenon User Guide, AT&T, Apr. 8, 2009, 146 pages.
MobileCom Provides All Residential Pay as You Go Subscribers the Ability to Talk for 1 Piaster Per Minute Day and Night, www.albawaba.com, Mar. 14, 2006.
Sellers, P., MCI Communications Yes, Brands Can Still Work Magic, www.money.cnn.com, Feb. 7, 1994.
Weisser, C., et al., What do you pay to stay connected?, Money Magazine, http://money.cnn.com/2003/11/20/pf/portability_strategy_0312/index.htm, Nov. 24, 2003.
European Search Report issued in connection with PCT/US2006022645., Sep. 6, 2011.
Second Office Action in Chinese Application No. 200680020479.9 mailed Mar. 22, 2012.
Office Action in Canadian Application No. 2588250 dated Aug. 23, 2013.
International Search Report (PCT/US2010/028954), Oct. 27, 2010.
International Preliminary Report on Patentability in application No. PCT/US2010/028954 mailed Sep. 27, 2011.
International Search Report (PCT/US2010/028960), Oct. 26, 2010.
International Preliminary Report on Patentability in application No. PCT/US2010/028960 dated Sep. 27, 2011.
International Search Report (PCT/US2010/028947), Nov. 12, 2010.
International Preliminary Report on Patentability in application No. PCT/US2010/028947 mailed Sep. 27, 2011.
Office Action in R.O.C. Application No. 098304597 dated Dec. 15, 2011, in 4 pages.
International Search Report (PCT/US2010/028894), Nov. 12, 2010.
International Preliminary Report on Patentability in application No. PCT/US2010/028894 mailed Sep. 27, 2011.
International Search Report issued in connection with PCT/US2010/028857, Oct. 11, 2010.
International Preliminary Report on Patentability in application No. PCT/US2010/028857 mailed Sep. 27, 2011.
International Search Report issued in connection with PCT/US2010/028863, Oct. 22, 2010.
International Preliminary Report on Patentability in application No. PCT/2010/028863 mailed Sep. 27, 2011.
International Search Report (PCT/US2010/028905), Nov. 12, 2010.
International Preliminary Report on Patentability in application No. PCT/US2010/028905 mailed on Sep. 27, 2011.
International Search Report issued in connection with PCT/US2010/028904, Nov. 8, 2010.
International Preliminary Report on Patentability in application No. PCT/US/2010/028904 mailed Sep. 27, 2011.
First Office Action in European Application No. 07812026.8 dated Jul. 17, 2012.
International Search Report (PCT/US2007070475), Jun. 29, 2011.
Office Action in Canadian Application No. 2657240 dated Sep. 3, 2013.

* cited by examiner

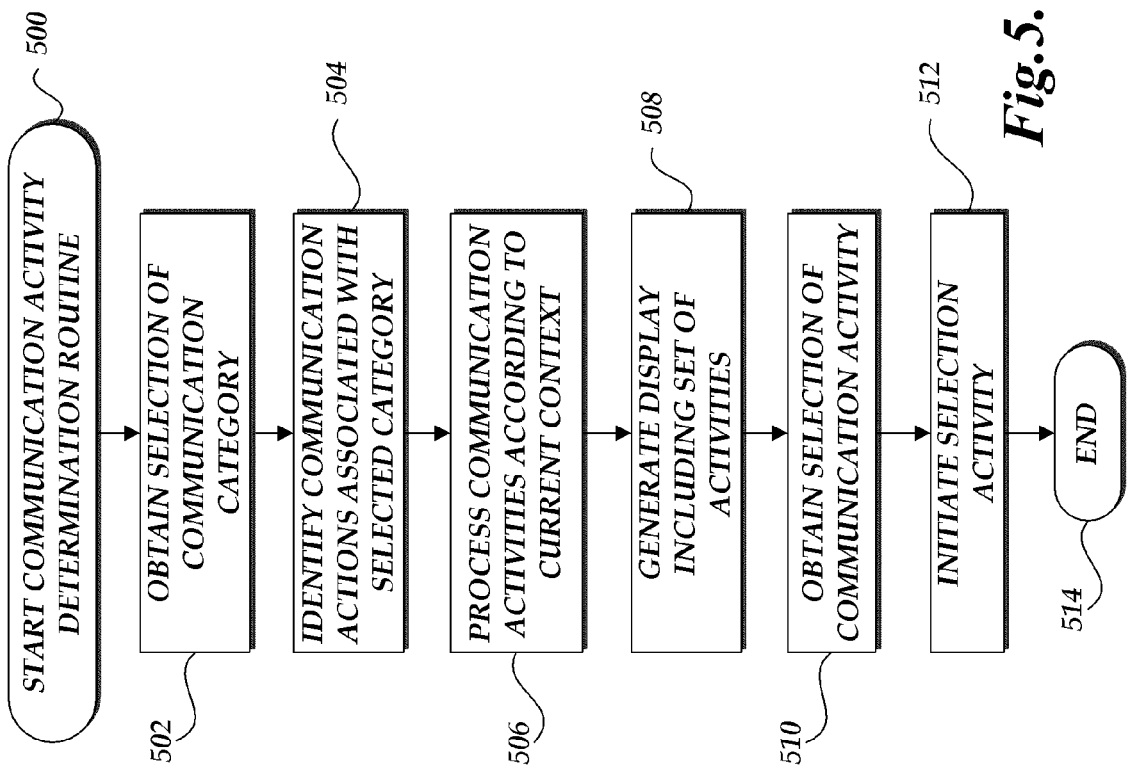

MANAGING COMMUNICATIONS UTILIZING COMMUNICATION CATEGORIES

CROSS-REFERENCE TO RELATED APPLICATION

This application is a continuation of U.S. patent application Ser. No. 12/413,397, entitled MANAGING COMMUNICATIONS UTILIZING COMMUNICATION CATEGORIES and filed Mar. 27, 2009, the entirety of which is incorporated herein by reference.

BACKGROUND

Generally described, telecommunication devices and communication networks facilitate the collection and exchange of information. Utilizing a communication network and relevant communication protocols, a telecommunication device can engage in audio or data communications with other telecommunication devices, such as voice calls, video calls, messaging (e.g., short message service ("SMS") or multimedia messaging service ("MMS")), content streaming, instant messaging, resource browsing (e.g., Web browsing), and the like.

To facilitate communications, telecommunication devices can be associated with software and hardware components that allow the telecommunication device to maintain contact information, such as telephone numbers, email addresses, messaging addresses, etc., utilized to establish and engage in communications via available communication channels. Typically, such contact information is maintained as contact information in which all known contact information for an identified entity, such as user, can be presented to a telecommunication device user. For example, a telecommunication device may present a user interface in which the contact information associated with a selected individual is presented in a list-based format. In another example, a telecommunication device with voice calling functionality may maintain a "last call list" that keeps track of telephone numbers of the most recent incoming or outgoing calls from the telecommunication device.

Although contact management user interfaces and software can facilitate the input and management of contact information for a larger set of contacts, typical contact management approaches can become deficient as the set of entities associated with a user grows. In one example, typical call list approaches are limited in the number of contacts identified in the user interfaces (e.g., the last 4 numbers called). Accordingly, such approaches can become deficient as the number of incoming or outgoing communications (e.g., voice calls) increases because potentially desired contacts are removed from the display based on order of the most recent incoming or outgoing communications.

In another example, typical contact management approaches relate to the presentation of the entire set of contacts that are associated with a user, such as in alphabetical order. As the number of contacts maintained in the telecommunication device, or on behalf of the telecommunication device increases, users may have increased difficulty in identifying contact information for specific entities. Additionally, for each contact, the typical contact management approach identifies all known contact information (e.g., phone numbers, IM aliases, email addresses, etc.) without regard to a desired, or preferred, communication method. Additionally, the typical contact management approach does not take into account the manner in which the contact was selected in presenting contact information.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein:

FIG. 5 is a flow diagram illustrative of a communication activity determination routine implemented by a communication management service to communication activity information;

DETAILED DESCRIPTION

Figure 1:
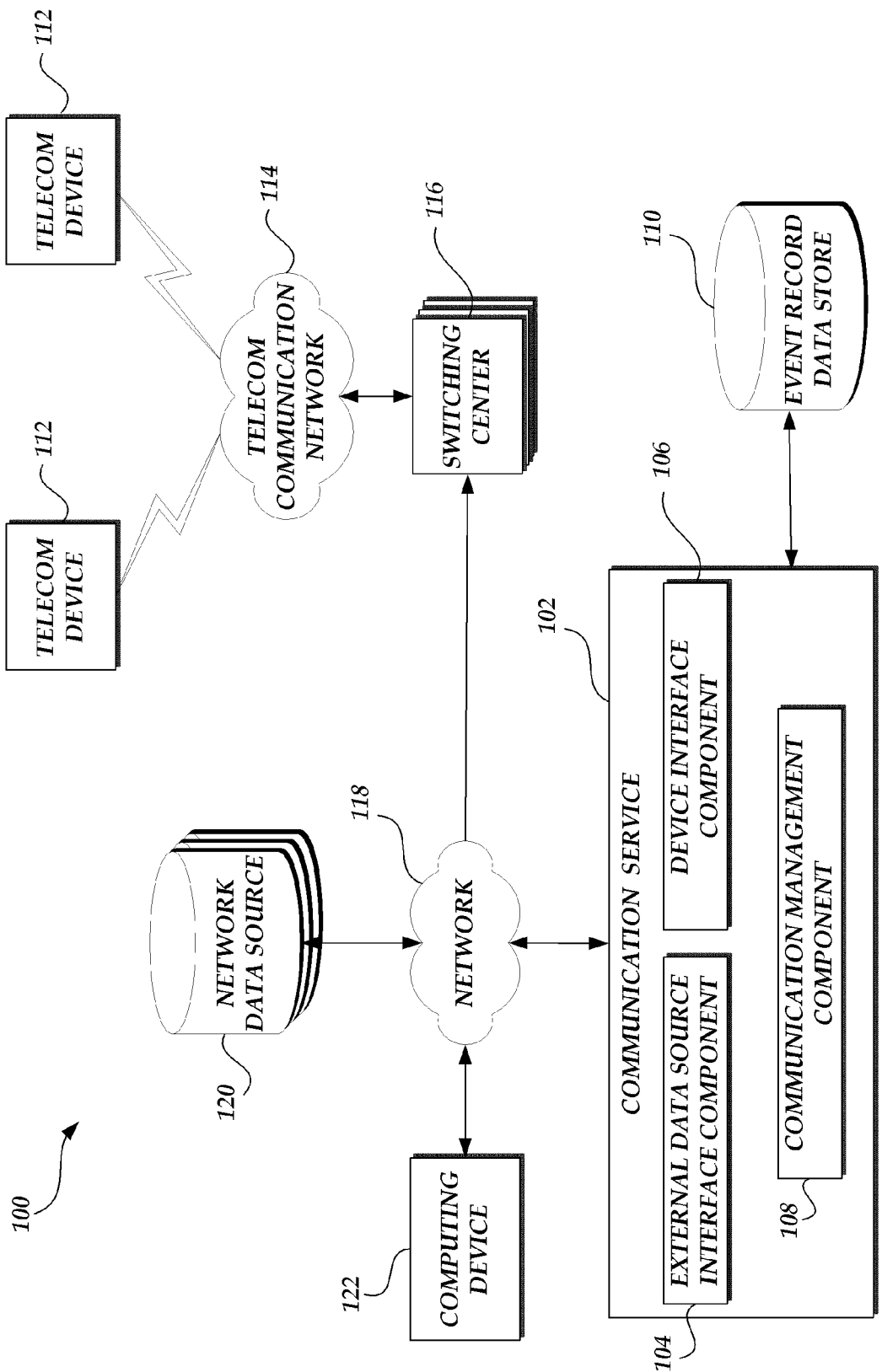
FIG. 1 is a block diagram illustrative of a telecommunication environment including a number of telecommunication devices and a communication processing service.

Generally described, aspects of the present disclosure relate to the management of contact information utilizing communication category and communication activity information. In an illustrative embodiment, a subset of contacts accessible by a telecommunication device can be associated with one or more communication categories. Illustratively, communication categories correspond to a logical organization of one or more communication activities that can be initiated, or cause to be initiated, by the telecommunication device. The communication categories do not correspond to the communication activities. Rather, they represent a collection of specific communication activities that are intended to achieve types of communication. Examples of communication categories can include, but are not limited to, sharing, calling, messaging, posting, broadcasting, and the like.

For a selected contact, the telecommunication device can generate a display that provides a user with a display of available (or possible) telecommunication categories associated with the selected contact. The display may be based on processing context information associated with the user, the selected contact, service plans, etc. Additionally, the display may be prioritized according to user profile information, preference information, historical information, etc. Upon selection of a specific communication category, the telecommunication device can then generate additional displays that identify a set of communication activities corresponding to the selected communication category. For example, for a selected messaging communication category, the telecommunication device may generate a display that identifies email, SMS, MMS, IM, Twitter, or other social networking sites as possible communication activities that correspond to the communication category. The identification of specific communication activities may be processed on context information or prioritized according to user profile, preference or historical information. Additionally, the activities may be configured in a manner such that selection of a specific communication activity initiates the selected communication activity with the selected contact (e.g., an SMS message configured with the appropriate identifier for the selected contact).

Although aspects of the present disclosure will be described with regard to an illustrative telecommunication environment and component interactions, communication protocols, flow diagrams and user interfaces, one skilled in the relevant art will appreciate that the disclosed embodiments are illustrative in nature and should not be construed as limiting. Specifically, although the term telecommunication device is used in this document, the term represents any type of device having a component for communicating with one or more other devices via one or more communication paths. Such communication paths can include wireless communication paths (via infra-red, RF, optical, terrestrial, or satellite communication media) and wired communication paths. Additionally, although the present disclosure references a telecommunication device, one skilled in the relevant art will appreciate that a telecommunication device may also be referred to as a wireless computing device, a mobile communication device, or a computing device. Examples of telecommunication devices are described below with regard to FIG. 1. Accordingly, reference to a telecommunication device should not be interpreted as including any particular functionality or operation not described in the present disclosure. Still further, although the present disclosure is described with regard to specific displays and specific methodologies and frameworks for generating communication categories and identifying communication activities, the present disclosure should not be construed to require combination of the disclosed embodiments or any specific variation unless such combination or variation is expressly identified.

With reference now to FIG. 1, a block diagram illustrative of a telecommunication environment 100 will be described. The telecommunication environment 100 can include a communication service 102. In an illustrative embodiment, the communication service 102 may be utilized to provide, maintain or transmit communication category or communication activity information to one or more telecommunication devices, as will be described below.

The communication category or communication activity information may be generated, at least in part, from information corresponding to interaction with individual users of telecommunication devices and maintained in a data store 110. Additionally, the communication service 102 may obtain additional information from external sources, such as network-based data sources 120. The additional information may become part of the communication category or communication activity information. Additionally, the additional information may be used by the communication service 102 to generate or process the communication category or communication activity information. Such network-based data sources may include web sites, location based services, social network services, telecommunication services, message publication services, etc. While the data store 110 is depicted in FIG. 1 as being local to the communication service 102, those skilled in the art will appreciate that the data store 110 may be remote to the communication service 102 and/or may be a network based service itself.

While the communication service 102 is depicted in FIG. 1 as implemented by a single computing device in the telecommunication environment 100, this is illustrative only. The communication service 102 may be embodied in a plurality of computing devices, each executing an instance of the communication service. A server or other computing device implementing the communication service 102 may include memory, processing unit(s), and computer readable medium drive(s), all of which may communicate with one another by way of a communication bus. The network interface may provide connectivity over the network 118 and/or other networks or computer systems. The processing unit(s) may communicate to and from memory containing program instructions that the processing unit(s) executes in order to operate the communication service 102. The memory generally includes RAM, ROM, and/or other persistent and auxiliary memory.

As illustrated in FIG. 1, the communication service 102 can include an external data source interface component 104 for obtaining external information from network data sources 120, such as location data, contact data, and other supplemental data that can be incorporated, directly or indirectly, into the communication category or communication activity information. Examples of external information can include images of an event location, digital media, social networking information, and the like. The communication service 102 can also include a device interface component 106 for obtaining information from one or more telecommunication devices (e.g., location data for telecommunication device(s), IP addresses assigned to computing device(s), etc.). The communication service 102 can further include a communication management component 108 for processing telecommunication device information and external information in generating various types of communication category and communication activity information or to provide communication category or communication activity information upon request.

One skilled in the relevant art will appreciate that the communication service 102 may correspond to a number of computer devices, such as server computing devices. Additionally, the external data source interface component 104, device interface component 106, and communication management component 108 may be implemented in a single computing device or across multiple computing devices. One skilled in the relevant art will also appreciate that the communication service 102 may include any one of a number of additional hardware and software components that would be utilized in the illustrative computerized network environment to carry out the illustrative functions of the service 102 or any of the individually identified components.

With continued reference to FIG. 1, the telecommunication device communication environment 100 can include a number of telecommunication devices 112 or other computing devices 122, each associated with a user. The telecommunication devices 112 or other computing devices 122 can generate the displays that facilitate interaction of a user with other users or other network-based resources. The telecommunication devices 112 can correspond to a wide variety of devices or components that are capable of initiating, receiving or facilitating communications over a communication network including, but not limited to, personal computing devices, electronic book readers (e.g., e-book readers), hand held computing devices, integrated components for inclusion in computing devices, home electronics, appliances, vehicles, machinery, landline telephones, network-based telephones (e.g., voice over IP ("VoIP"), cordless telephones, cellular telephones, smart phones, modems, personal digital assistants, laptop computers, gaming devices, media devices, and the like. In an illustrative embodiment, the telecommunication devices 112 include a wide variety of software and hardware components for establishing communications over one or more communication networks, including wireless communication network 114, a wired communication network (not shown), or an IP-based telecommunication network (not shown). Illustrative components of a telecommunication device 112 will be described in greater detail with regard to FIG. 2.

In an illustrative embodiment, the telecommunication device communication environment 100 can include a number of additional components, systems and/or subsystems for facilitating communications with the telecommunication devices 112 or the communication service 102. The additional components can include one or more switching centers 116 for establishing communications with the telecommunication devices 112 via the wireless communication network 114, such as a cellular radio access network, a wireless network based on the family of IEEE 802.11 technical standards ("WiFi"), a wireless network based on IEEE 802.16 standards ("WiMax"), a converged wireless telecommunication network such as Unlicensed Mobile Access ("UMA"), or General Access Network ("GAN"), and other wireless networks. The operation of mobile communication networks, such as wireless communication network 114 are well known and will not be described in greater detail. As illustrated in FIG. 1, the mobile switching center 116 includes interfaces for establishing various communications via a communication network 118, such as the Internet, intranets, private networks and point to point networks, generally referred to as the "network." Although the wireless communication network 114 is illustrated as a single communication network, one skilled in the relevant art will appreciate that the communication network can be made up of any number of public or private communication networks and/or network connections.

As noted above, the telecommunication device communication environment 100 can further include one or more network data sources 120 for providing external information to the communication service 102. The network data sources 120 may include a number of computing devices for obtaining and processing requests for information from either the communication service 102 and/or the telecommunication devices 112.

Figure 2:
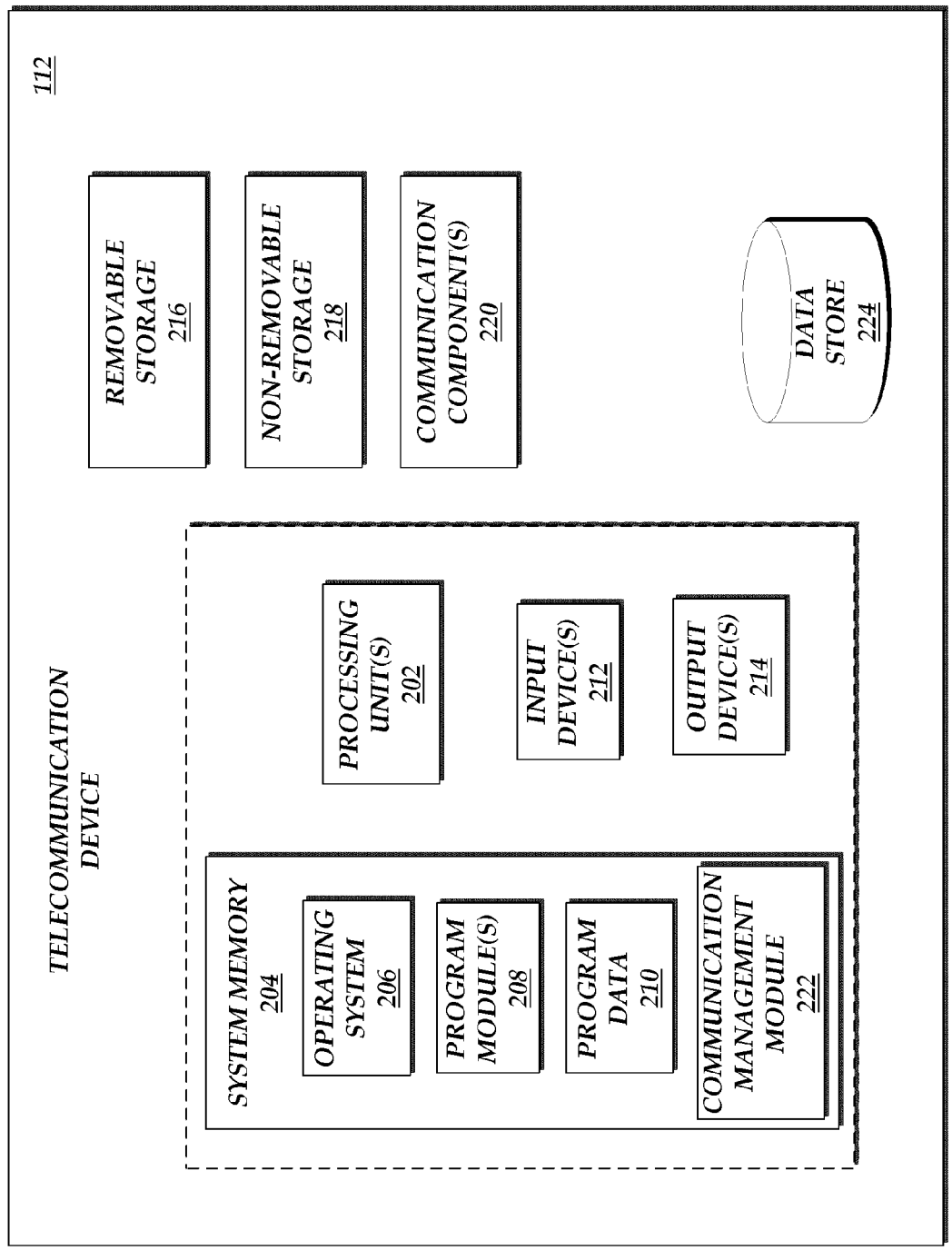
FIG. 2 is a block diagram illustrative of components of a telecommunication device for use in the generation, management, and display of communication category and communication activity information.

With reference now to FIG. 2, illustrative components of a telecommunication device, such as telecommunication device 112, for use in the generation of displays including communication category and communication activity information will be described. The telecommunication device 112 may include one or more processing units 202, such as one or more CPUs. The telecommunication device 112 may also include system memory 204, which may correspond to any combination of volatile and/or non-volatile storage mechanisms. The system memory 204 may store information which provides an operating system component 206, various program components 208, program data 210, a communication management module 222 and/or other components. As will be explained in greater detail below, the communication management module 222 stored in system memory of the telecommunication device 112 may perform all or some of the functions described above in connection with the data processing component 109 of the communication service 102 (FIG. 1). The above-enumerated list of components is representative and is not exhaustive of the types of functions performed, or components implemented, by the telecommunication device 112. One skilled in the relevant art will appreciate that additional or alternative components may also be included in the telecommunication device 112 to carry out other intended functions such as a mobile telephone functions.

The telecommunication device 112 performs functions by using the processing unit(s) 202 to execute instructions provided by the system memory 204. The telecommunication device 112 may also include one or more input devices 212 (keyboard, mouse device, specialized selection keys, etc.) and one or more output devices 214 (displays, printers, audio output mechanisms, etc.). Illustrative user interfaces for a telecommunication device 112 will be described with regard to FIGS. 4, 7, and 8, described below.

With continued reference to FIG. 2, the telecommunication device 112 may also include one or more types of removable storage 216 and one or more types of non-removable storage 218. Still further, the telecommunication device 112 can include communication components 220 for facilitating communication via wired and wireless communication networks, such as the wireless communication network 114 and network 118 (FIG. 1). Examples of various communication protocols include, but are not limited to, Bluetooth, the family of IEEE 802.11 technical standards ("WiFi"), the IEEE 802.16 standards ("WiMax"), short message service ("SMS"), voice over IP ("VoIP") as well as various generation cellular air interface protocols (including, but not limited to, air interface protocols based on CDMA, TDMA, GSM, WCDMA, CDMA2000, TD-SCDMA, WTDMA, LTE, OFDMA, and similar technologies).

As previously described, in accordance with an aspect of the present disclosure, a telecommunication device 112 can generate one or more displays on a user interface via an output device 114. In an illustrative embodiment, the displays include various display objects that represent communication categories, communication activities, or combinations thereof. In an illustrative embodiment, display objects may be selectable by a user via any one of a variety of input methods and devices. Additionally, the determination of the display objects that are included in the displays may be predetermined, automatically determined (in real time or semi-real time), or manually configured/managed according to user-specified criteria. Further, the display and formatting of the display objects and the illustrative displays may be specified according to specific telecommunication device capabilities, service provider specifications, or user configurations.

Figure 3A:
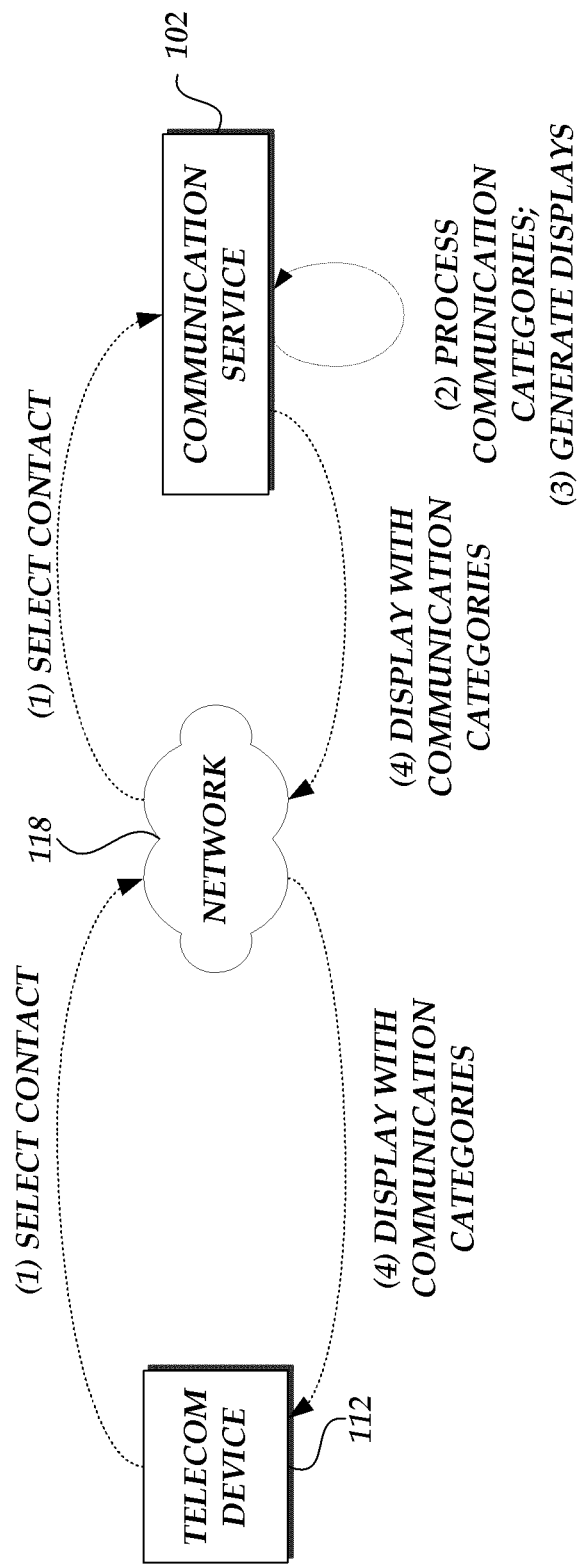
FIGS. 3A and 3B are block diagrams of the telecommunication environment of FIG. 1 illustrating the interaction between a telecommunication device and a communication management service for presenting communication categories and communication activities to a telecommunication device user.
Figure 3B:
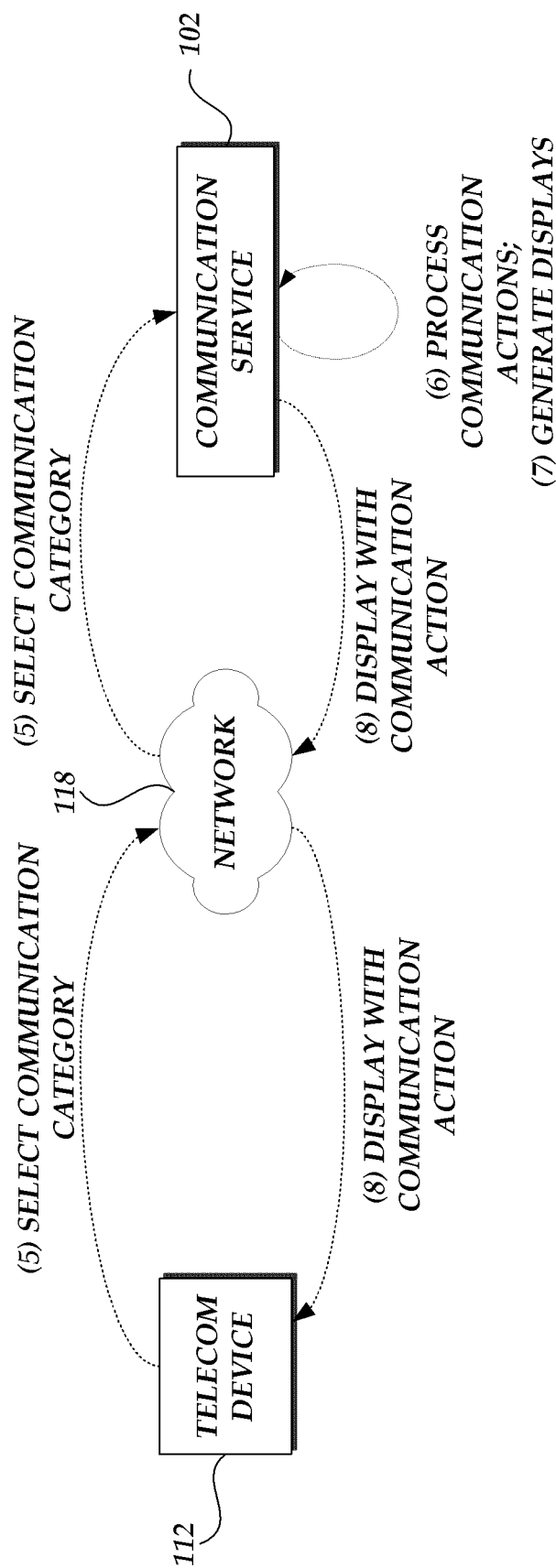

With reference now to FIGS. 3A and 3B, illustrative interactions with the components of the telecommunication environment 100 for the generation of displays including communication categories and communication activities will be described. Although the present disclosure will be described with regard to interactions between a telecommunication device 112 and a communication service 102 via a communication network 108, one skilled in the relevant art will appreciate that such interaction may be practiced between alternative components in the telecommunication environment 100 or in conjunction with additional components. Accordingly, the illustrated interaction in FIGS. 3A and 3B should not be construed as limiting.

With reference to FIG. 3A, a user of a telecommunication device 112 accesses the telecommunication device and is presented with a subset of contacts. The subset of contacts can correspond to a user, or user account. At some point, the telecommunication device 112 obtains a user selection of a contact from the subset of contacts available. For example, the user may select a display object on a display screen corresponding to a specific contact. Examples screen displays for selecting display objects corresponding to contacts will be described with regard to FIGS. 6A-6C.

A communication service 102 obtains and processes the user selection of a contact. Specifically, in an illustrative embodiment, the communication service 102 identifies one or more communication categories that correspond to the selected contact. The communication service 102 can then generate a display, or provide information such that the telecommunication device 112 can generate, that includes display objects representative of the identified communication categories.

With reference now to FIG. 3B, a user may be presented with any one of a variety of displays that identify the communication categories associated with a selected contact. Illustrative displays having display objects corresponding to communication categories will be described with regard to FIGS. 7A and 7B. As will be explained in greater detail below, the communication category display objects may be displayed on the telecommunication device 112 in a display that only includes other communication category display objects. Alternatively, the communication category display objects may be displayed on the telecommunication device 112 in a display that may include other communication category display objects, one or more communication activity display objects, or other display objects. Thereafter, the telecommunication device 112 obtains a user selection of a specific communication category, which is transmitted to the communication service 102. The communication service 102 processes the selected communication category to identify one or more communication activities associated with the selected communication category. The communication service 102 can then generate a display, or provide information such that the telecommunication device 112 can generate, that includes display objects representative of the identified communication activities. Accordingly, the telecommunication device 112 can process a selection of a communication activity, or activities, to initiate or have initiated the selected communication activity.

Figure 4:
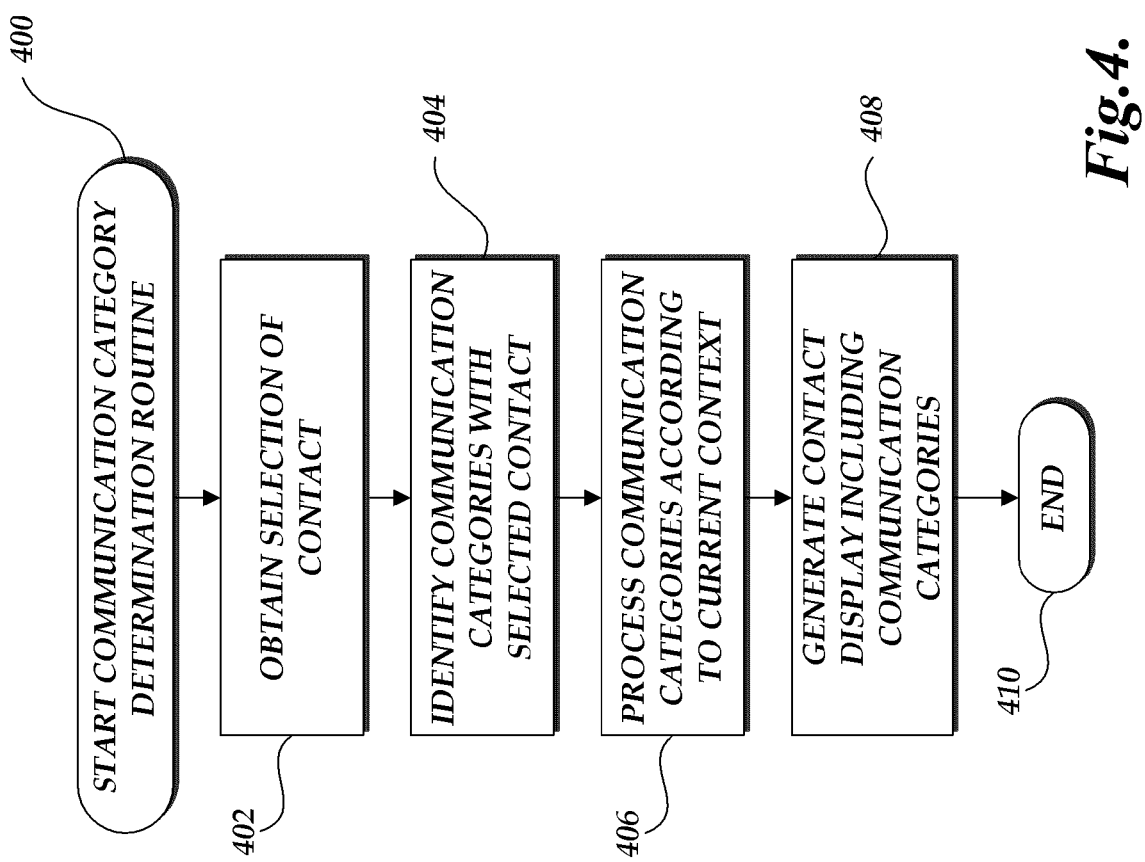
FIG. 4 is a flow diagram illustrative of a communication category determination routine implemented by a communication management service to generate communication category information.

With reference now to FIGS. 4 and 5, flow diagrams illustrative of various routines implemented by a communication service 102 to generate communication category information and communication activity information will be described. Such routines will be described as being generally performed by the communication service 102. However, one skilled in the relevant art will appreciate that actions/steps outlined for either routine may be implemented by one or many computing devices/components that are associated with the telecommunication environment 100. Accordingly, any functionality described in reference to either routine could be generally performed by any component in the telecommunication device management environment 100, including communication management module 222 of the telecommunication device 112, other modules, or combinations thereof. Thus, the following illustrative embodiments should not be construed as limiting.

Turning to FIG. 4, a flow diagram of an illustrative of a communication category determination routine 400 implemented by a communication management service to generate communication category information will be described. At block 402, the communication service 102 obtains a selection of a contact. In an illustrative embodiment, any one of a variety of methodologies may be utilized to present users of a telecommunication device 112 with at least a subset of contacts for selection. Three illustrative screen displays for the selection of contacts will be described below with regard to FIGS. 6A-6C. In an illustrative embodiment, the selection of the contact may be achieved utilizing a variety of input methods and hardware or software components in the telecommunications device 112. Examples include, but are not limited to, touch screen interfaces, specialized keys, stylus or other input devices, software based menus, voice commands, and the like.

At block 404, the communication service 102 identifies one or more communication categories associated with the selected contact. As previously described, the communication categories relate to a grouping communication activities in which a user of the telecommunication device 112 can initiate communication with the selected contact via the telecommunication device 112, or other computing device 122. Examples of communication categories include, but are not limited to, direct communication, group communication, synchronous communication, asynchronous communication, immediate communication, delayed communication, personal communication, voice calling, video calling, messaging, publishing, sharing, distributing, public communication, and the like. Additionally, in some embodiments, communication categories being associated with the same or substantially similar sets of communication activities may be labeled differently by a service provider or a telecommunication device user.

In an illustrative embodiment, the communication categories associated with a selected contact may be predetermined or otherwise statically determined and maintained in the data store 110 (FIG. 1). Accordingly, the identification of the communication categories by the communication service 102 relates to recalling and processing the static data. In another embodiment, the communication service 102, or other component or service, may dynamically determine the communication categories that are to be associated with the selected contact. In such a dynamic determination embodiment, the communication service 102 may maintain a set of possible communication categories that may be utilized and filter the set of possible communication categories as applicable. Additionally, the communication service 102 can obtain additional information associated with the selected contact, such as polling computing devices associated with the selected contact, accessing user profile or preference information, etc. to identify available communication categories or to filter possible communication category information. The communication service 102 may maintain the results of a dynamic determination, such as in a data cache, to reuse the communication category information for some period of time.

At block 406, the communication service 102 process the communication category information, at least in part, based on context information. Generally described, context information can correspond to information that is published, or otherwise made available, about current or future availability of communication categories or communication activities for an identified entity. Context information can include indications of whether specific communication categories or communication activities are available and a duration of such availability or unavailability (e.g., no voice calls from 4 to 6 pm). Context information can also include preference information indicating preferred communication categories or communication activities for the identified entity (e.g., prefer to receive SMS or MMS messages during scheduled meetings). Context information may be expressly published by the identified entity or determined by reference to various information sources, such as calendaring information, location information, etc. Additionally, context information may be applied as general rules for all attempts to communicate with the identified entity or selectively applied to specific individuals or types of individuals (e.g., allow voice calls from any entity associated with a "high priority label" in my address book).

Illustratively, the communication service 102 can obtain information about the user associated with the telecommunication device 112, the selected contact, or both. Based on the collected context information, the communication service 102 can determine whether one or more communication categories are not currently available. In another example, the communication service 102 can determine whether one or more communication categories should be prioritized based on preferences identified in the context information. In still a further example, the communication service 102 can modify the communication category information to conform to the context information. For example, if the context information indicates that only voice calls to a landline are available, a communication category corresponding to "voice calls" would have to be configured such that only voice calls to landlines would be presented as an option. One skilled in the relevant art will appreciate that block 406 may be omitted altogether or partially implemented in accordance with user preference, service provider preferences, and the availability of context information to the communication service 102.

At block 408, the communication service 102 generates one or more displays that include the identified contact information. Illustrative screen displays having display objects representative of communication category information will be described with regard to FIGS. 7A and 7B. One skilled in the relevant art will appreciate the screen displays will be generated on the telecommunication device 112. Accordingly, the communication service 102 may generate the displays for display on the telecommunications device 112 or otherwise provide information necessary for the displays to be generated on the telecommunication device 112. At block 410, the routine 400 terminates.

Turning now to FIG. 5, a flow diagram of an illustrative of a communication activity determination routine 500 implemented by a communication management service to generate communication activity information will be described. As previously described, in an illustrative embodiment, communication category information does not correspond to a communication activity. Rather, communication category information relates to a set of communication activities or a collection of communication activities that are further identified to the user of telecommunication device 112. Accordingly, to initiate a specific communication activity associated with a communication category, a user of a telecommunication device can select a specific communication category and be subsequently presented with the set of communication activities associated with the selected communication categories. However, as will be explained below with reference to illustrative screen displays, in one embodiment, users may be presented with displays that can incorporate a combination of data objects representative of communication categories and communication activities.

At block 502, the communication service 102 obtains a selection of a communication category. As previously described with regard to routine 400 (FIG. 4), any one of a variety of methodologies may be utilized to present users of a telecommunication device 112 with at least a subset of contacts for selection. The selection of communication categories may be achieved utilizing a variety of input methods and hardware or software components in the telecommunications device 112. At block 504, the communication service 102 identifies one or more communication activities associated with the selected communication category. Examples of communication activities that may be associated with one or more communication categories include, but are not limited to, voice calls, video calls, VoIP calls or other packet-based communications, SMS, MMS, Web logs (Blogs), micro-Blogs, electronic mail, voicemail, location publication, text to speech, speech to text, audio files/dictation, social network APIs, other network resource interfaces, search engine inputs, and the like. Additionally, in an illustrative embodiment, a communication activity may be defined not only in terms of the underlying method of communication, but also in the specific configuration of the method of communication. For example, a SMS communication activity may be defined in terms of both the type of message to be delivered and the configuration of the specific addressees (or other parameters) for the message.

In an illustrative embodiment, the communication activities associated with a selected communication category may be predetermined or otherwise statically determined and maintained in the data store 110 (FIG. 1). Accordingly, the identification of the communication activities by the communication service 102 relates to recalling and processing the static data. In another embodiment, the communication service 102, or other component or service, may dynamically determine the communication activities that are to be associated with the selected communication category. In such a dynamic determination embodiment, the communication service 102 may maintain a set of possible communication activities that have been associated with at least a subset of communication categories and filter the set of possible communication activities as applicable. Additionally, the communication service 102 can obtain additional information associated with the selected contact, such as polling computing devices associated with the selected contact, accessing user profile or preference information, etc. to identify available communication activities or to filter possible communication activity information. The communication service 102 may maintain the results of a dynamic determination, such as in a data cache, to reuse the communication activity information for some period of time. Additionally, the communication service 102 may identify or determine the communication activity information as part of the determination of communication category information (block 404 of FIG. 4). In such an embodiment, block 504 may be omitted or partially performed, such as to check for updates or expired data.

At block 506, the communication service 102 process the communication activity information, at least in part, based on context information. As previously described, context information can correspond to information that is published, or otherwise made available, about current or future availability of communication categories or communication activities for an identified entity. Context information can include indications of whether specific communication categories or communication activities are available and a duration of such availability or unavailability (e.g., no SMS messages after 8 pm). Context information can also include preference information indicating preferred communication categories or communication activities for the identified entity (e.g., prefer to receive SMS or MMS messages during scheduled meetings). Context information may be expressly published by the identified entity or determined by reference to various information sources, such as calendaring information, location information, etc. Additionally, context information may be applied as general rules for all attempts to communicate with the identified entity or selectively applied to specific individuals or types of individuals (e.g., allow voice calls from any entity associated with a "high priority label" in my address book).

Illustratively, the communication service 102 can obtain information about the user associated with the telecommunication device 112, the selected contact, or both. Based on the collected context information, the communication service 102 can determine whether one or more communication activities otherwise identified with the selected communication category are not currently available. In another example, the communication service 102 can determine whether one or more communication activities should be prioritized based on preferences identified in the context information. In still a further example, the communication service 102 can modify the communication activity information to conform to the context information. One skilled in the relevant art will appreciate that block 506 may be omitted altogether or partially implemented in accordance with user preference, service provider preferences, and the availability of context information to the communication service 102. Additionally, some or all of the processing associated with block 506 may be performed as part of the processing of context information for the determination of communication categories at block 406 (FIG. 4). Similarly, block 506 may be performed even if the processing of context information for the determination of communication categories at block 406 is omitted. An example of a system, method and interface for displaying and prioritizing communication activities according to individual context is described in co-pending and commonly assigned U.S. patent application Ser. No. 12/133,324, entitled "Messaging Device for Delivering Messages to Recipients Based on Availability and Preferences of Recipients," which is incorporated by reference herein.

At block 508, the communication service 102 generates one or more displays that include the identified communication activities for the selected communication category. Illustrative screen displays having display objects representative of communication category information will be described with regard to FIGS. 8A and 8B. One skilled in the relevant art will appreciate the screen displays will be generated on the telecommunication device 112. Accordingly, the communication service 102 may generate the displays for display on the telecommunications device 112 or otherwise provide information necessary for the displays to be generated on the telecommunication device 112. At block 510, the communication service 102 obtains a selection of a specific communication activity and initiates the communication activity at block 514. One skilled in the relevant art will appreciate that the initiation of communication activities may be controlled solely by the telecommunication device 112. Accordingly, block 510 and 512 may be omitted altogether. Alternatively, in the event that the communication activity requires interaction with other components in the telecommunication environment 100, the communication service 102 may work in conjunction with the telecommunication device 112 or on behalf of the telecommunication device to initiate the communication activity, or otherwise cause the communication activity to be performed. At block 514, the routine 500 terminates.

Figure 6B:
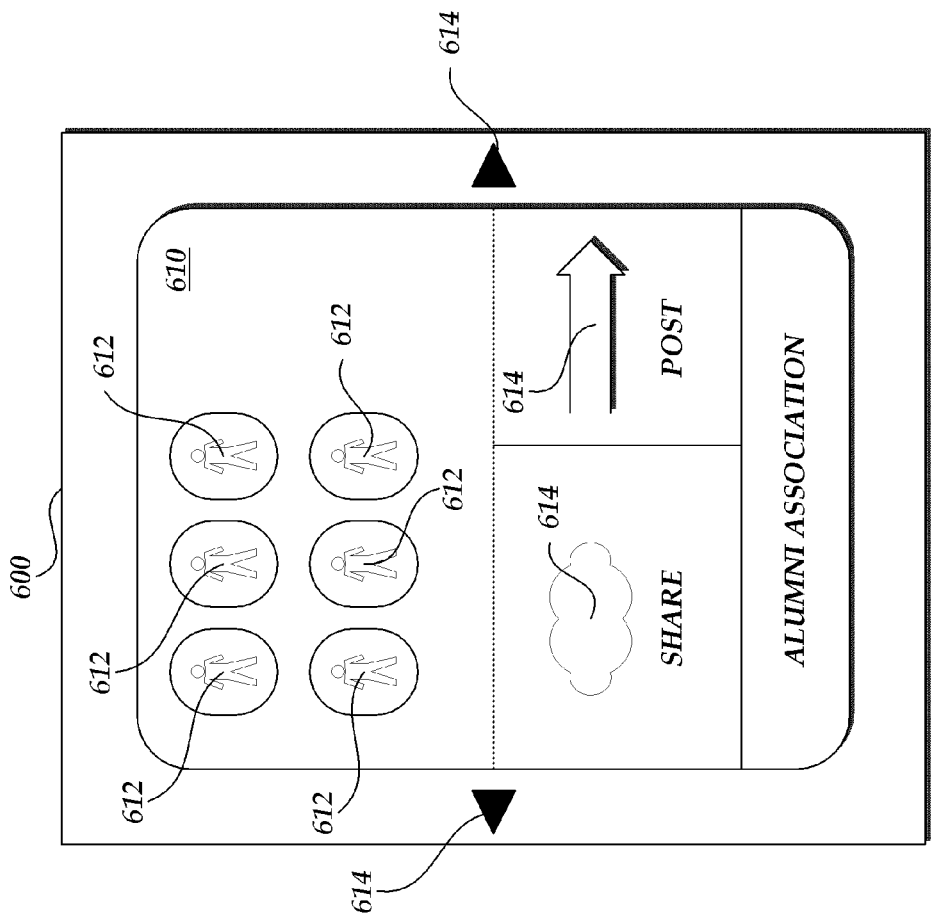
FIGS. 6A-6C are illustrative user interfaces generated on a telecommunication device for presenting a subset of contacts associated with a telecommunications device user for selection.
Figure 6A:
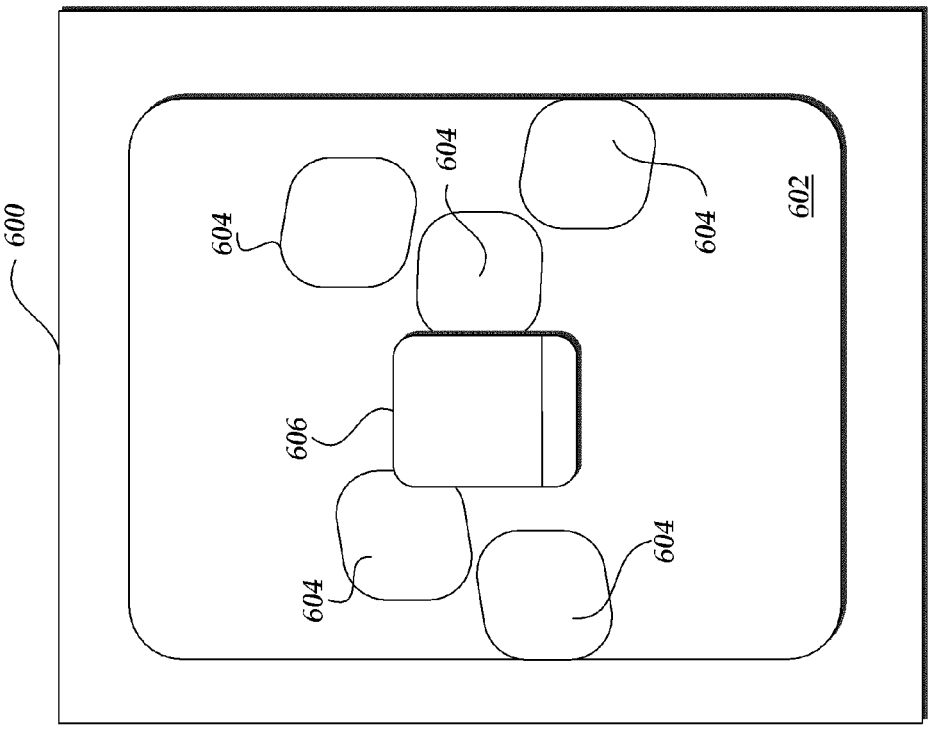
Figure 6C:
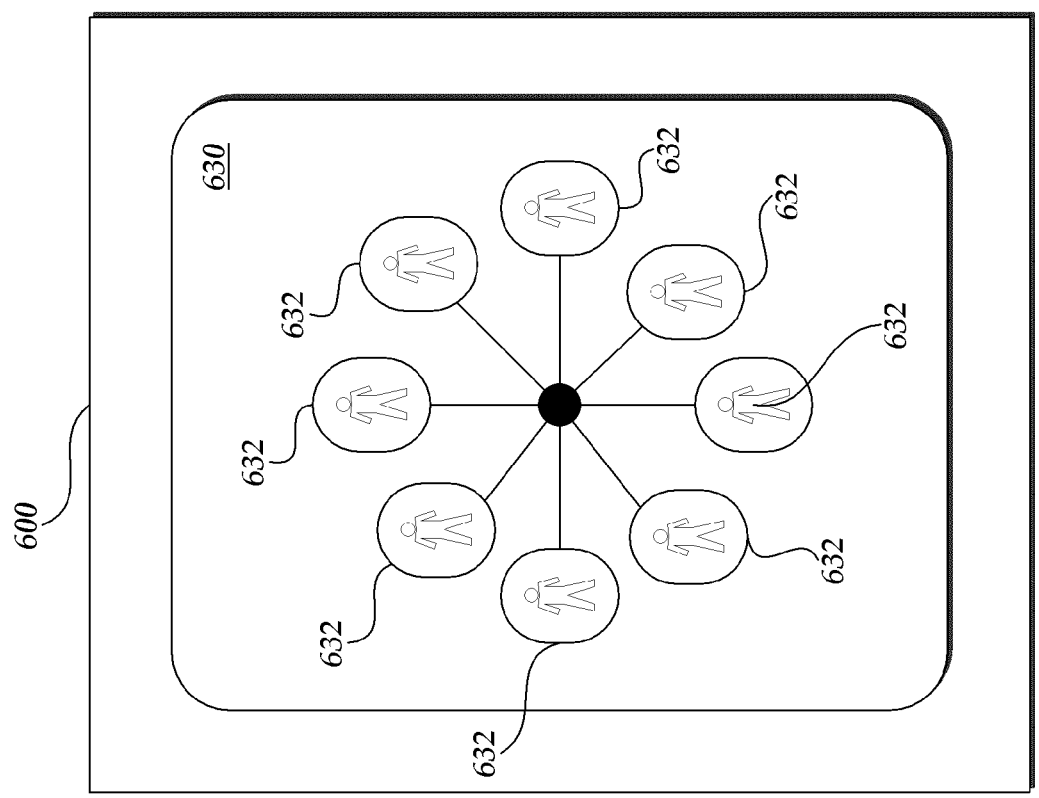

With reference now to FIGS. 6A-6C, illustrative user interfaces generated on a telecommunication device for presenting a subset of contacts associated with a telecommunications device user for selection will be described. One skilled in the relevant art will appreciate that the screen display are illustrative in nature and should be construed as limiting. With reference to FIG. 6A, one embodiment of a user interface generated by the telecommunications device 112 for facilitating the selection of contacts will be described. In this embodiment, a display screen 600 includes a first portion 602 for displaying movement of a set of graphical identifiers about an axis external to the telecommunications device 112. The graphical identifiers can be considered display objects 402 in which each display object corresponds to a specific contact. For example, the display objects 402 may correspond to contacts that have been identified by the user as "favorites" or in which audio call communications are under a special service provider rate plan. As the rotation of the display objects 402 is emulated, one display object is manipulated to be the focal point of the interface, as illustrated on display object 604. Accordingly, the user can select the contact associated with the focal point display object 604. Depending on the capabilities of the telecommunication device 112, other display objects may also be selectable.

With reference to FIG. 6B, another embodiment of a user interface generated by the telecommunications device 112 for facilitating the selection of contacts will be described. In this embodiment, a display screen 600 includes a first portion 610 for displaying display objects representative of contacts as part of a group-based information display. Specifically, the group-based information can be represented as a display that incorporates a selection of display objects 612 corresponding to contacts and display objects 614 corresponding to applications or other executable components. In this illustrative embodiment, the display objects 612 may be selectable by a user of the telecommunication device 112 in a variety of manners. Additionally, the display objects 612 and 614 corresponding to the contacts and applications and other executable components can be configured according to organizational criteria common to the objects.

With reference to FIG. 6C, another embodiment of a user interface generated by the telecommunications device 112 for facilitating the selection of contacts will be described. In this embodiment, a display screen 600 includes a first portion 630 for displaying movement of a set of graphical identifiers about an axis. The graphical identifiers can be considered display objects 632 in which each display object corresponds to a specific contact. For example, the display objects 632 may correspond to contacts that have been identified by on behalf of the user as the contacts most frequently accessed by the user. As the rotation of the display objects 632 is emulated, a user can selected any of the display objects 632. Alternatively, the size and formatting of one or more of the display objects 632 may also be varied to facilitate focus on particular display objects 632.

Figure 7B:
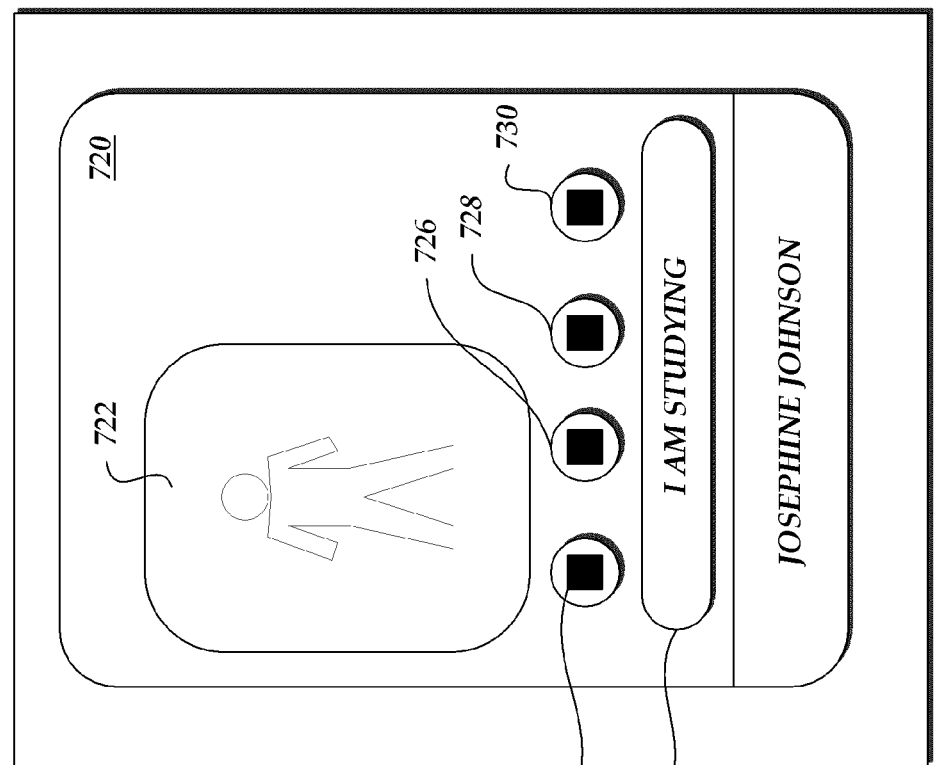
FIGS. 7A and 7B are illustrative user interfaces generated on a telecommunication device for presenting communication categories associated with a selected contact.
Figure 7A:
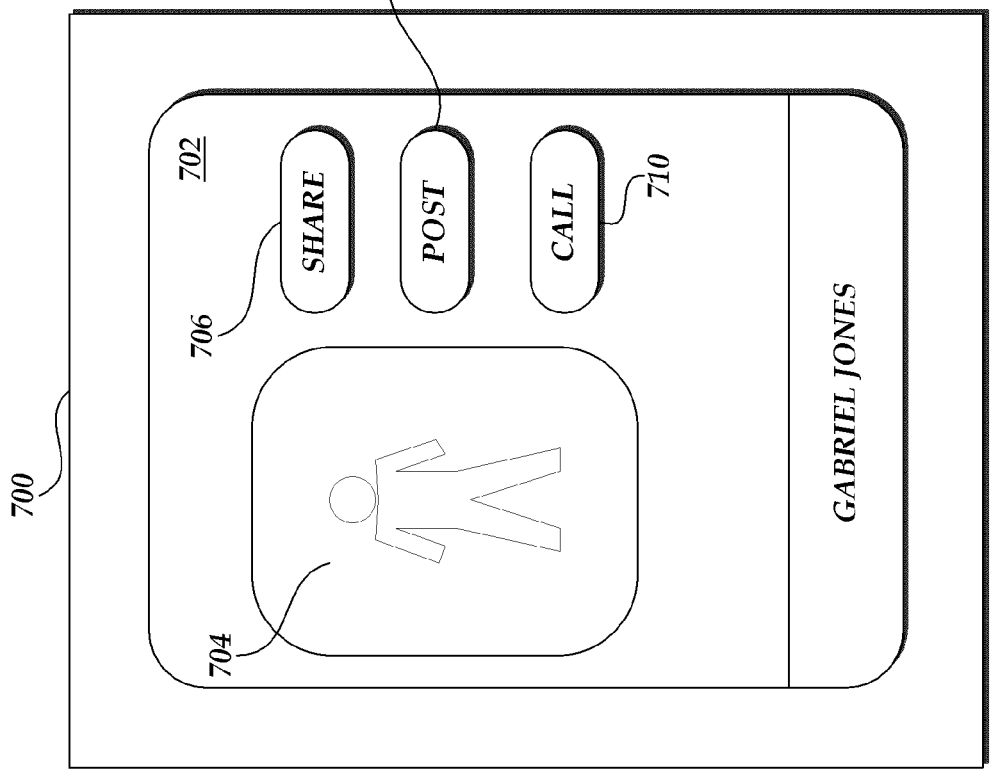

With reference now to FIGS. 7A and 7B, illustrative user interfaces generated on a telecommunication device for presenting communication categories for a selected contact will be described. One skilled in the relevant art will appreciate that the screen display are illustrative in nature and should be construed as limiting. With reference to FIG. 7A, one embodiment of a user interface generated by the telecommunications device 112 for facilitating the display and selection of communication categories for a selected contact will be described. In this embodiment, a display screen 700 includes a first portion 702 for displaying communication categories. The first portion 702 includes one or more display objects 704 that correspond to a representation of the selected contact, including text, graphics, multi-media and the like that facilitates the identification of the selected contact. As also illustrated in FIG. 7A, the first portion 702 also includes a set of three display objects 704, 706, and 708 that are representative of communication categories, "SHARE," "POST," and "CALL," respectively. In this embodiment, the first portion 702 only includes display objects 704-708 that are representative of communication categories and does not include any display objects that are representative of communication activities. The display objects 704-708 may be selectable in variety of manners, as described above.

Turning now to FIG. 7B, another embodiment of a user interface generated by the telecommunications device 112 for facilitating the display and selection of communication categories for a selected contact will be described. In this embodiment, a display screen 700 includes a first portion 720 for displaying communication categories. Similar to the screen display described in FIG. 7A, the first portion 720 includes one or more display objects 722 that correspond to a representation of the selected contact, including text, graphics, multi-media and the like that facilitates the identification of the selected contact. The first portion 720 also includes a set of four display objects 722-730, representative of communication categories. As previously discussed, the display objects 722-730 may be selected, ordered, or otherwise prioritized, according to a number of factors including preference information, historical use or other criteria.

With continued reference to FIG. 7B, in this embodiment, the first portion 702 also includes a display object 732 that is not representative of communication categories. Instead, display object 732 corresponds to a communication activity that is selectable by a user and will result in the initiation of a corresponding communication activity. In one example, display object 732 may correspond to a communication activity that is common to two or more communication categories 722-730. In another example, display object 732 may correspond to a communication activity that is not common to any communication categories or that is not associated with the identified communication categories 722-730.

Figure 8B:
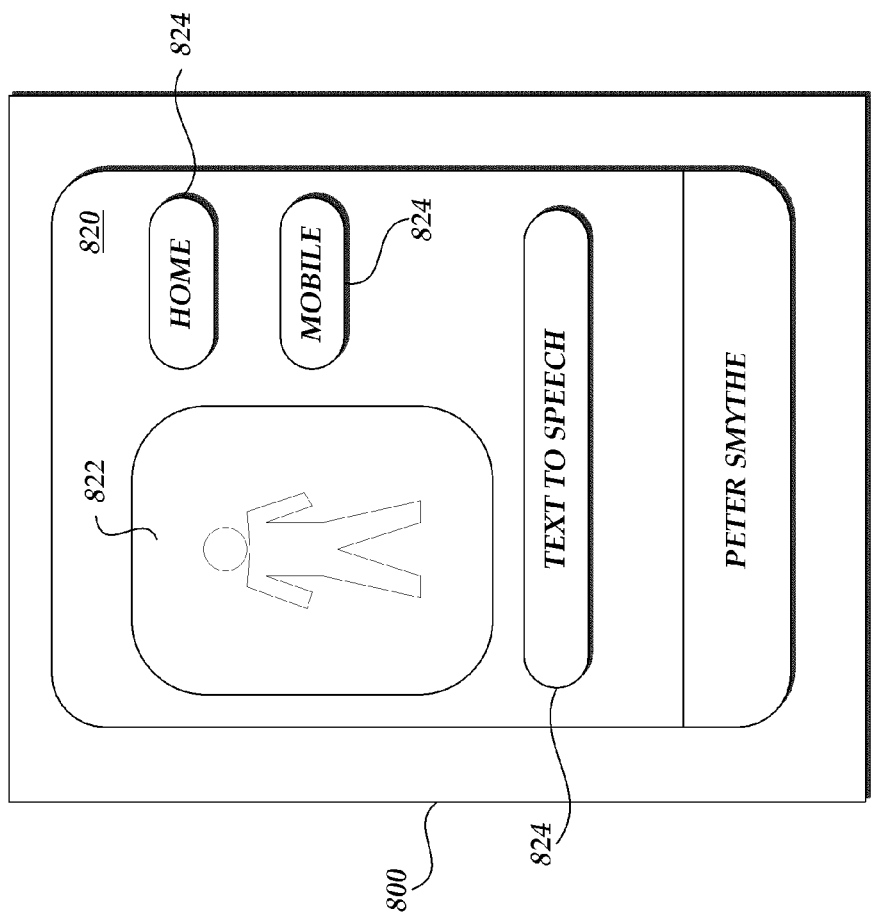
FIGS. 8A and 8B are illustrative user interfaces generated on a telecommunication device for presenting a set of communication activities associated with a selected communication activity.
Figure 8A:
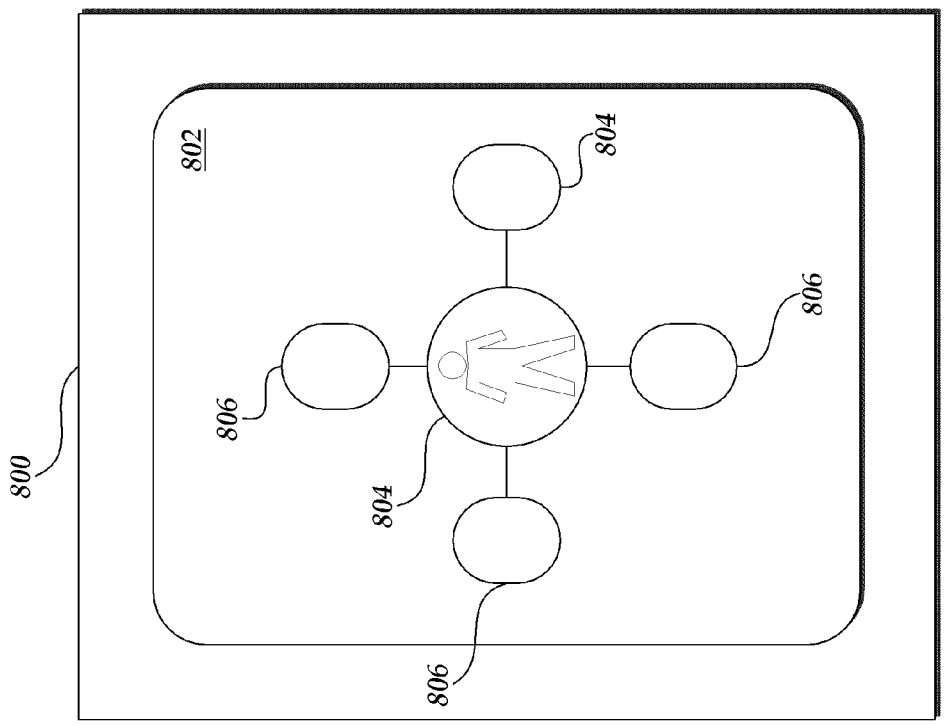

With reference now to FIGS. 8A and 8B, illustrative user interfaces generated on a telecommunication device for presenting communication activities will be described. One skilled in the relevant art will appreciate that the screen display are illustrative in nature and should be construed as limiting. With reference to FIG. 8A, the display 800 includes a first portion 802 for displaying movement of a set of graphical identifiers about an axis. The graphical identifiers can be considered display objects 804 are representative of communication activities that correspond to the selected contact 806 and a selected communication category. For example, the display objects 802 may correspond to communication activities related to a "messaging" communication category, such as email, SMS, IM and MMS communication activities. As the rotation of the display objects 804 is emulated, a user can selected any of the display objects 804. Alternatively, the size and formatting of one or more of the display objects 804 may also be varied to facilitate focus on particular display objects 804. As previously described, the communication activities may be configured based on the selected communication category and the selected contact.

With reference to FIG. 8B, another embodiment of a user interface generated by the telecommunications device 112 for facilitating the display and selection of communication categories for a selected contact will be described. In this embodiment, a display screen 800 includes a first portion 820 for displaying communication categories. The first portion 820 includes one or more display objects 822 that correspond to a representation of the selected contact, including text, graphics, multi-media and the like that facilitates the identification of the selected contact. The first portion 820 also includes a set of three display objects 824, 826 and 828 that are representative of communication activities relating to a calling communication activity, "HOME," "MOBILE," and "TEXT TO SPEECH," respectively. As previously described, the communication activities may be configured based on the selected communication category and the selected contact.

In addition to the above-described illustrative screen displays, additional embodiments for arrangements of communication categories and associated communication activities will be described. However, one skilled in the relevant art will appreciate that the disclosed embodiments are not exhaustive of the communication categories or associated communication activities that may be utilized in accordance with the present application. Additionally, although specific communication categories will be described in pairs for illustrative purposes, such examples should not be construed as requiring pairing of any particular communication categories or excluding additional or alternative combinations.

In one embodiment, a first communication category, labeled "Direct Communication," corresponds to an organization of communication activities configured to result in a direct communication with the selected contact. The communication activities can illustratively include voice calls (configured to known calling identifiers associated with the selected contact) and SMS messaging. In the same embodiment, another communication category, labeled "Group Communication," corresponds to an organization of communication activities to result in communication with the selected contact non-direct communication methodologies. The communication activities can illustratively include emails (configured according to a group distribution list), SMS messages (configured according to a group distribution list), Blogs, and micro-Blogs.

In another embodiment, a first communication category, labeled "Communicate Now," corresponds to an organization of communication activities configured to result in an immediate communication with the selected contact. The communication activities can illustratively include voice or video calls (configured to specific calling identifiers associated with the selected contact), SMS messaging, and email messaging (configured in accordance with a high priority designation. In the same embodiment, another communication category, labeled "Communicate Later," corresponds to an organization of communication activities to result in a non-immediate communication with the selected contact. The communication activities can illustratively include emails (configured according to a low priority designation), Blogs, and micro-Blogs.

In a further embodiment, a first communication category, labeled "Synchronous Communication," corresponds to an organization of communication activities configured to elicit an immediate response from the selected contact. The communication activities can illustratively include voice or video calls (configured to specific calling identifiers associated with the selected contact, SMS and MMS messaging, and IM messaging. In the same embodiment, another communication category, labeled "Asynchronous Messaging," corresponds to an organization of communication activities to result in a non-immediate response from the selected contact. The communication activities can illustratively include emails, Blogs, and micro-Blogs.

In yet another embodiment, a first communication category, labeled "Family," corresponds to an organization of communication activities configured to result in a communication with the selected contact that includes members of a group designated as "Family." The communication activities can illustratively include Blogs, social networking APIs, and emails (configured according to a group distribution list). In the same embodiment, another communication category, labeled "Individual," corresponds to an organization of communication activities to result in a direct communication with the selected contact. The communication activities can illustratively include voice calls (configured to known calling identifiers associated with the selected contact) and SMS messaging.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing communications comprising:
    a data store for maintaining information regarding communication categories and communication activities corresponding to telecommunication devices;
    a communication management component, implemented by executing instructions on a processor associated with a telecommunication device, the communication management component operative to:
        identify a subset of contacts associated with a user of a telecommunication device, wherein the subset of user contacts includes a portion of contacts accessible by the telecommunication device;
        determine first and second communication categories for the at least subset of contacts, wherein the first and second communication categories are associated with a set of communication activities, wherein the set of communication activities associated with the first communication category and the set of communication activities associated with the second communication category have at least one communication activity in common, and wherein the first and second communication categories do not correspond to a communication activity;
        obtain a selection of a contact corresponding to the subset of contacts;
        cause the generation of a display on the telecommunication device, the display including a representation of the first and second communication categories;
        obtain a selection of at least one of the first and second communication category;
        cause the generation of a display on the telecommunication device, the display including a representation at least one of the set of communication activities associated with the selected communication category;
        obtain a selection of a communication activity; and
        cause the initiation of the selected communication activity on the telecommunication device.

2. The system as recited in claim 1, wherein the communication management component predetermines the first and second communication categories.

3. The system as recited in claim 1, wherein the communication management component dynamically determines the first and second communication categories.

4. The system as recited in claim 1, wherein the display including the first and second communication categories does not include any display objects representative of a communication activity.

5. The system as recited in claim 1, wherein the display including the first and second communication categories includes at least one display object representative of at least one communication activity associated with the first and second communication activity.

6. The system as recited in claim 1, wherein the display including the first and second communication categories includes at least one display object representative of at least one communication activity not associated with the first and second communication activity.

7. The system as recited in claim 1, wherein the communication management component determines the first and second communication categories based on a context of at least one of the user of the telecommunication device and at least one of the subset of contacts.

8. The system as recited in claim 1, wherein at least one communication activity in the set of communication activities associated with the first communication category is determined according to a context of at least one of the user of the telecommunication device and at least one of the subset of contacts.

9. The system as recited in claim 1, wherein the communication management component prioritizes the communication activities included in the display on the telecommunication device including a representation at least one of the set of communication activities associated with the selected communication category.

10. The system as recited in claim 9, wherein the communication management component prioritizes based on at least one of a frequency of use, a cost associated with the communication activity, a last used communication activity, and a service provider rate plan.

11. The system as recited in claim 1, wherein the set of communication activities associated with the first communication category is determined prior to selection of the first communication category.

12. The system as recited in claim 1, wherein the set of communication activities associated with the first communication category is determined dynamically.

13. The system as recited in claim 12, wherein the communication management component determines the set the communication activities associated with the first communication category upon selection of the communication category.

14. A computer-implemented method comprising:
obtaining a selection of a subset of contacts associated with a user of a telecommunication device, wherein the subset of user contacts includes a portion of contacts accessible by the telecommunication device;
determining one or more communication categories for the at least subset of contacts, wherein the one or more communication categories are associated with a set of communication activities and wherein the one or more communication categories do not correspond to a communication activity;
obtaining a selection of a contact corresponding to the subset of contacts;
causing the generation of a first display on the telecommunication device, the display including a representation of the one or more communication categories;
obtaining a selection of a communication category represented in the display;
causing the generation of a second display on the telecommunication device, the display including a representation at least a portion of the set of communication activities associated with the selected communication category;
obtaining a selection of a communication activity represented in the second display; and
causing the initiation of the selected communication activity on the telecommunication device.

15. The method as recited in claim 14, wherein determining one or more communication categories for the at least subset of contacts includes determining the one or more communication categories prior to obtaining the selection of a contact corresponding to the subset of contacts.

16. The method as recited in claim 14, wherein determining one or more communication categories for the at least subset of contacts includes dynamically determining the one or more communication categories upon obtaining the selection of a contact corresponding to the subset of contacts.

17. The method as recited in claim 14, wherein the display including the one or more communication categories does not include any display objects representative of a communication activity.

18. The method as recited in claim 14, wherein determining one or more communication categories for the at least subset of contacts includes determining the one or more communication categories based on a context of at least one of the user of the telecommunication device and at least one of the subset of contacts.

19. The method as recited in claim 14 further comprising determining the set of communication activities associated with a selected communication category prior to obtaining the selection of the communication category.

20. The method as recited in claim 14 further comprising dynamically determining the set of communication activities associated with a selected communication category upon obtaining the selection of the communication category.

21. The method as recited in claim 14, wherein at least one communication activity in the set of communication activities associated with the communication category is determined according to a context of at least one of the user of the telecommunication device and at least one of the subset of contacts.

22. The method as recited in claim 14 further comprising prioritizing the communication activities included in the second display on the telecommunication device.

23. A system comprising:
a data store for maintaining information regarding communication categories and communication activities corresponding to telecommunication devices;
a communication management component, implemented by executing instructions on a processor, the communication management component operative to:
identify a subset of contacts associated with a user of a telecommunication device, wherein the subset of user contacts includes a portion of contacts accessible by the telecommunication device;
determine one or more communication categories for the at least subset of contacts, wherein the one or more communication categories are associated with a set of communication activities and wherein the one or more communication categories do not correspond to a communication activity; and
associate the one or more communication categories associated for the at least subset of contacts in the data store.

24. The system as recited in claim 23, wherein the communication management dynamically determines the one or more communication categories based on a selection of a contact from the subset of contacts.

25. The system as recited in claim 23, wherein the communication management component causes the generation of a display including representations of the subset of contacts associated with the communication categories.

26. The system as recited in claim 25, wherein the display including the subset of contacts associated with the communication categories includes only representations of contacts associated with the communication categories.

27. The system as recited in claim 23, wherein the communication management component is further operative to:
obtain a selection of a contact corresponding to the subset of contacts; and
cause the generation of a display on the telecommunication device, the display including a representation of the determined one or more communication categories.

28. The system as recited in claim 27, wherein the communication management component is further operative to determine one or more communication activities associated with the one or more communication categories.

29. The system as recited in claim 28, wherein the communication management component is further operative to:
obtain a selection of a communication category corresponding to the subset of one or more communication categories; and
cause the generation of a display on the telecommunication device, the display including a representation of the determined one or more communication activities associated with the selected communication category.

30. The system as recited in claim 23, wherein the communication management component is implemented by executing instructions on a processor associated with a telecommunication device.

31. The system as recited in claim 23, wherein the communication management component is implemented by executing instructions on a processor associated with a network resource.

* * * * *

UNITED STATES PATENT AND TRADEMARK OFFICE
CERTIFICATE OF CORRECTION

PATENT NO. : 9,160,828 B2
APPLICATION NO. : 14/040465
DATED : October 13, 2015
INVENTOR(S) : Michael Steffen Vance et al.

It is certified that error appears in the above-identified patent and that said Letters Patent is hereby corrected as shown below:

Title page,

In column 2 (item 56) at line 1, Under Other Publications, change "Wirelein," to --Wireline,--.

In the claims,

In column 16 at line 9 (approx.), In Claim 1, after "representation" insert --of--.

In column 16 at line 51, In Claim 9, after "representation" insert --of--.

In column 16 at line 67, In Claim 13, change "set the" to --set of--.

In column 17 at line 24 (approx.), In Claim 14, before "at" insert --of--.

Signed and Sealed this
Second Day of August, 2016

Michelle K. Lee
*Director of the United States Patent and Trademark Office*